Aug. 18, 1942.   H. G. FISHACK ET AL   2,293,127
COMPUTING DEVICE
Filed May 3, 1937   22 Sheets-Sheet 1

INVENTORS
HOWARD G. FISHACK
LOREN B. MILLER
JOHN J. SHIVELY
BY
John J. Shively
ATTORNEY

Fig. 5

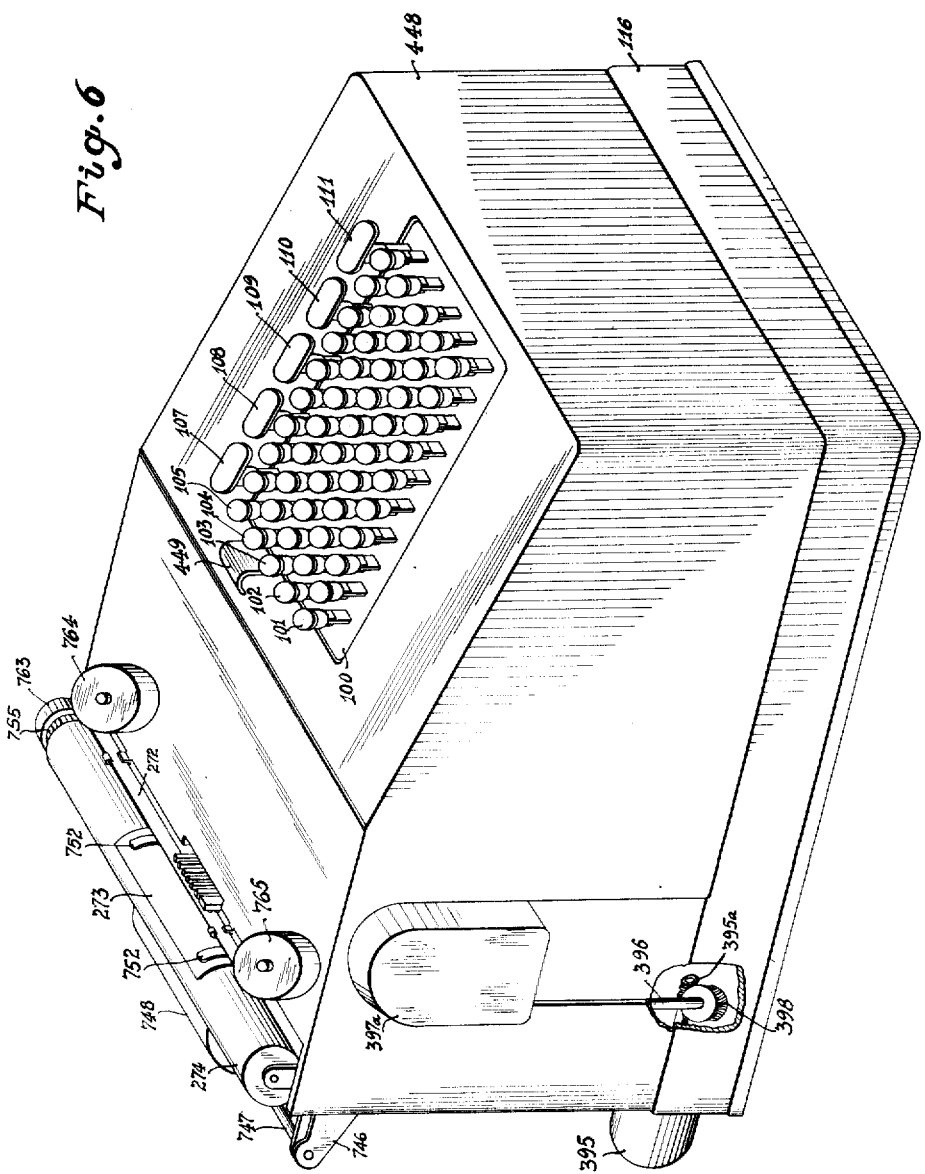

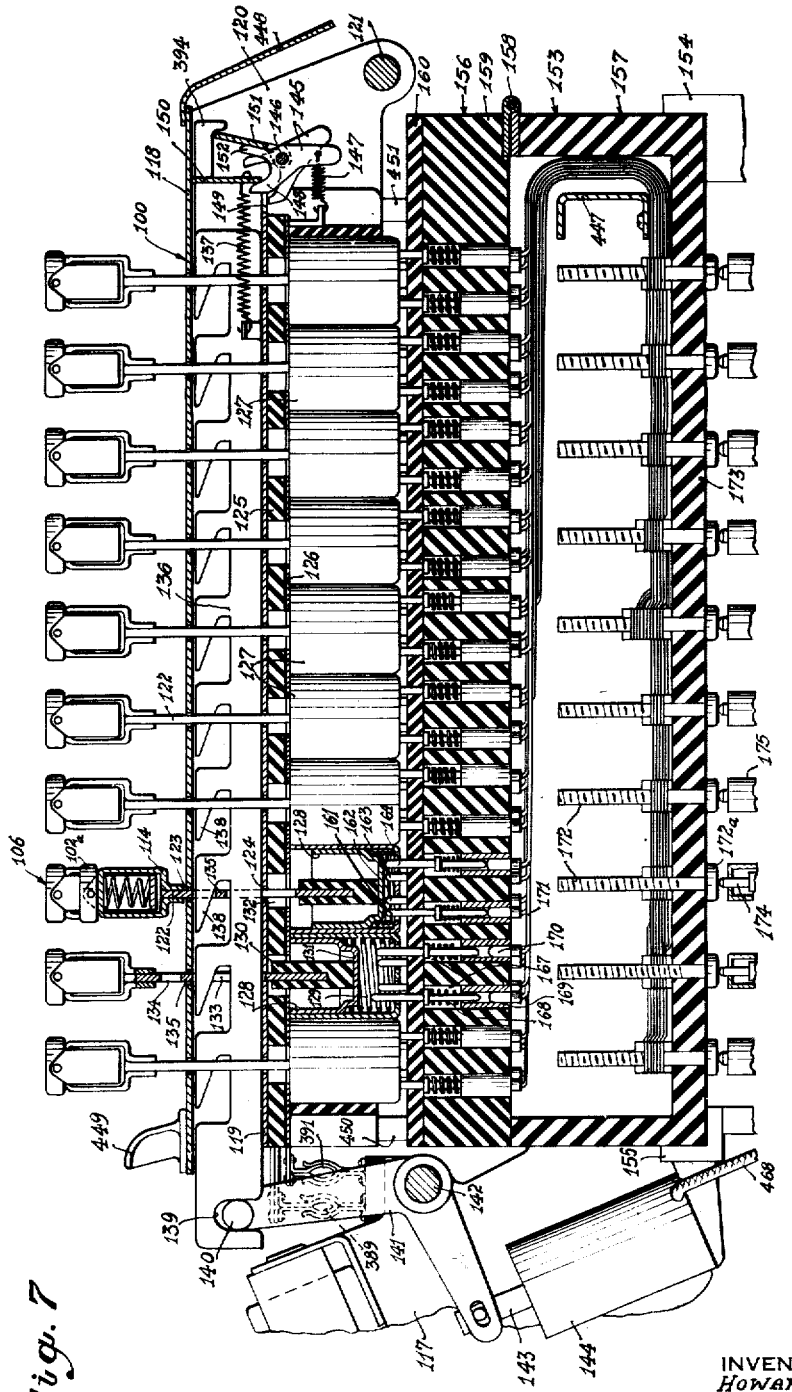

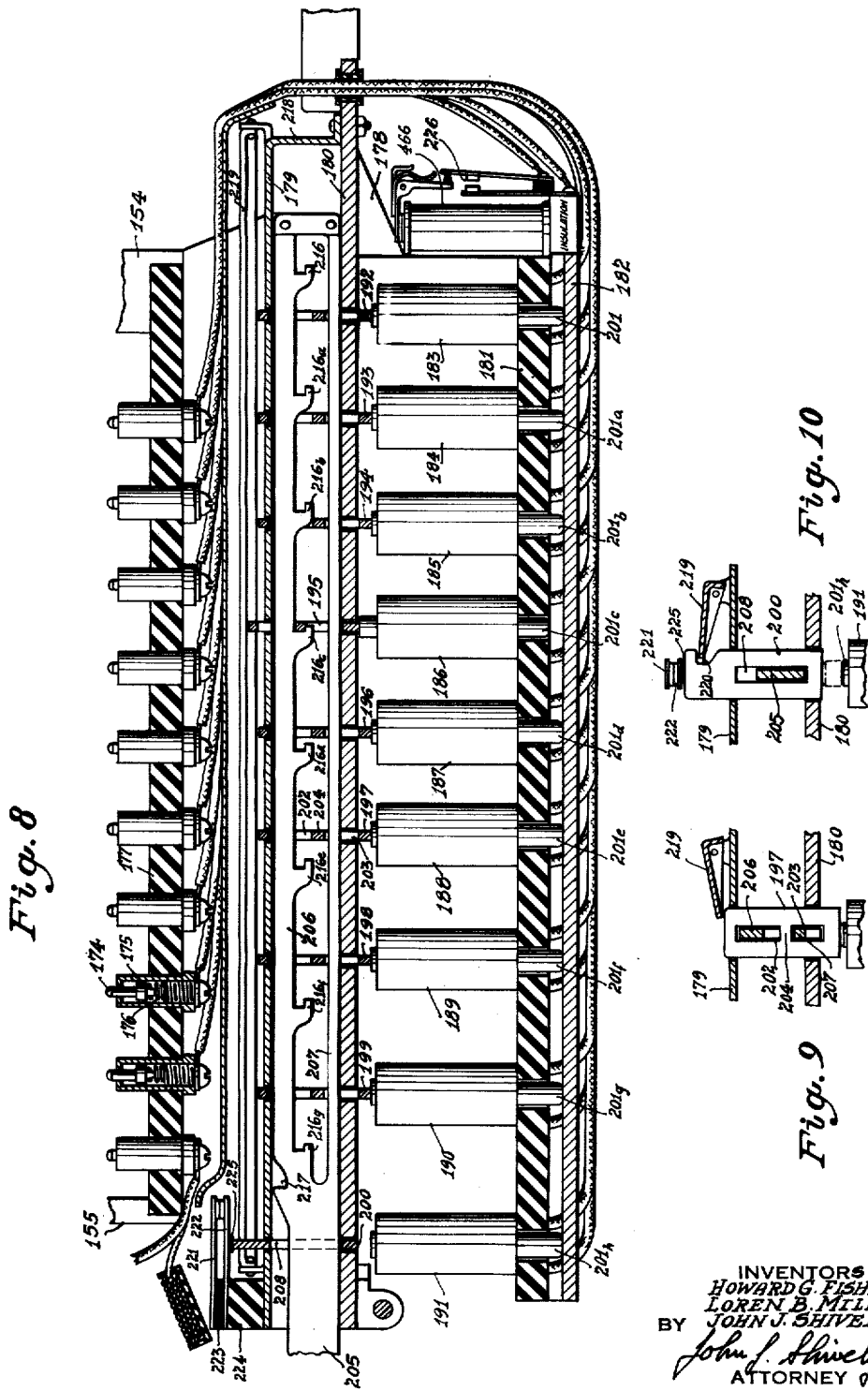

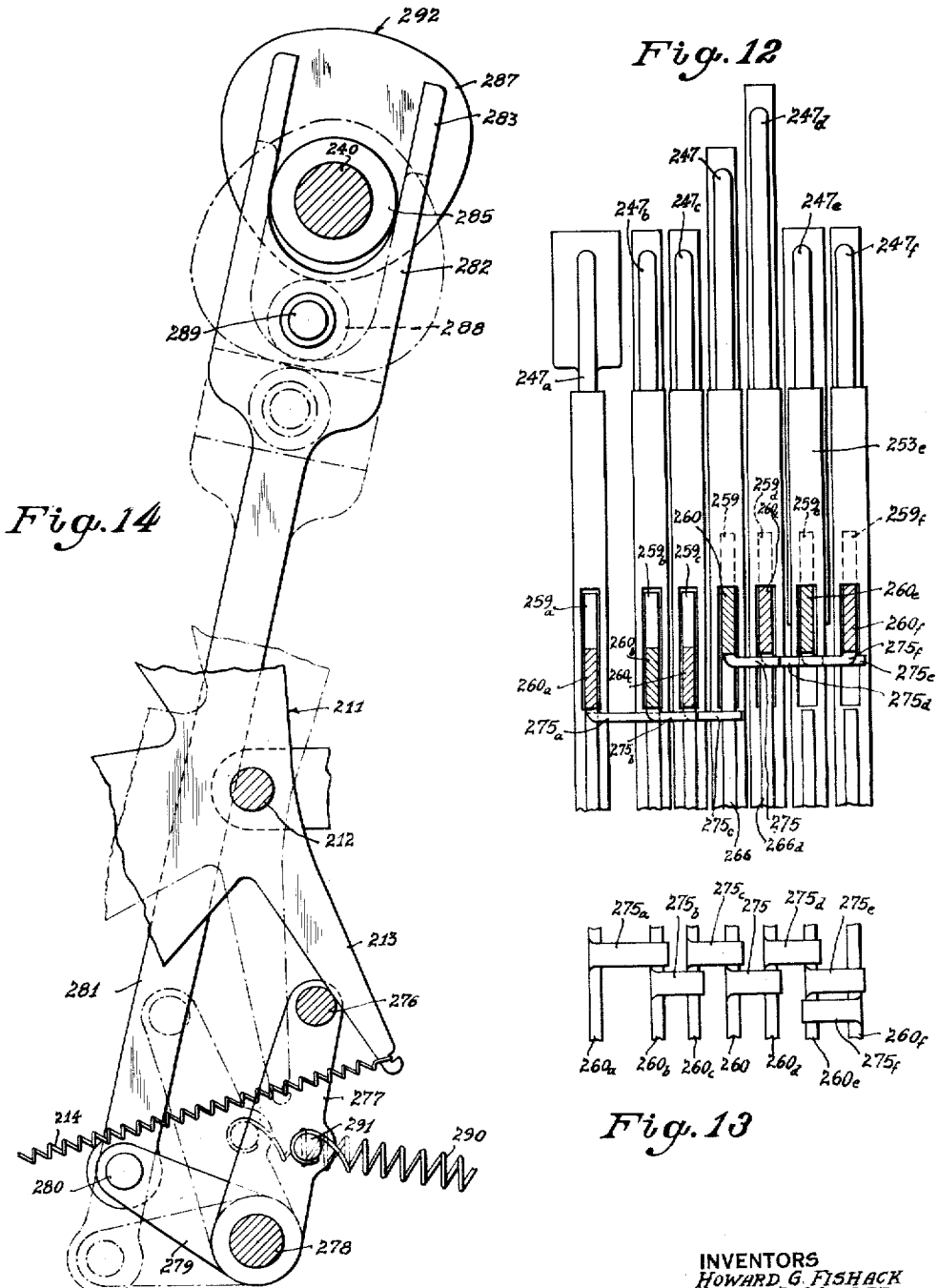

Aug. 18, 1942.   H. G. FISHACK ET AL   2,293,127
COMPUTING DEVICE
Filed May 3, 1937   22 Sheets-Sheet 8
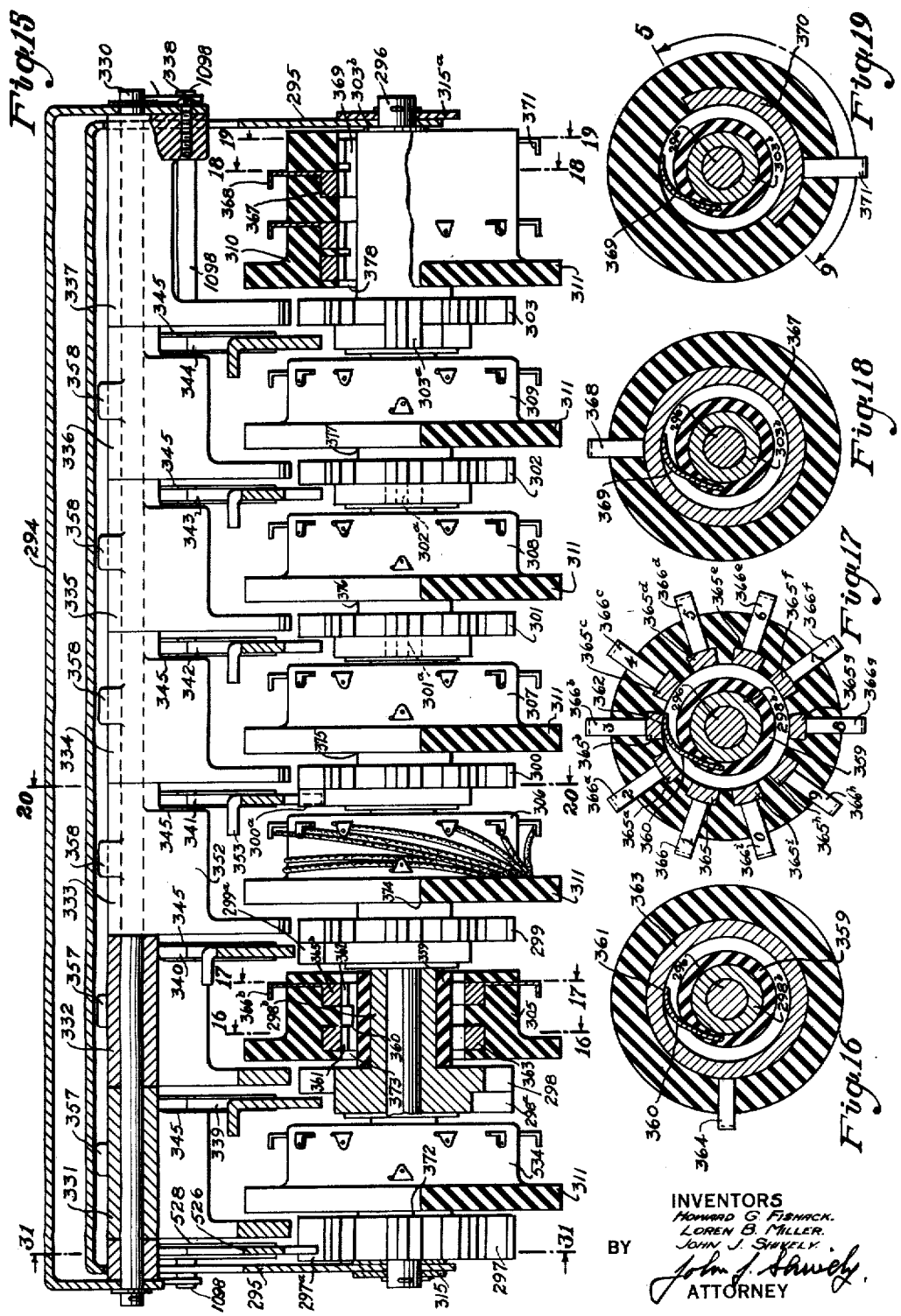
INVENTORS
HOWARD G. FISHACK.
LOREN B. MILLER.
JOHN J. SHIVELY.
BY John J. Shively
ATTORNEY Aug. 18, 1942.  H. G. FISHACK ET AL  2,293,127
COMPUTING DEVICE
Filed May 3, 1937  22 Sheets-Sheet 9

INVENTORS
HOWARD G. FISHACK.
LOREN B. MILLER.
JOHN J. SHIVELY.
BY
ATTORNEY

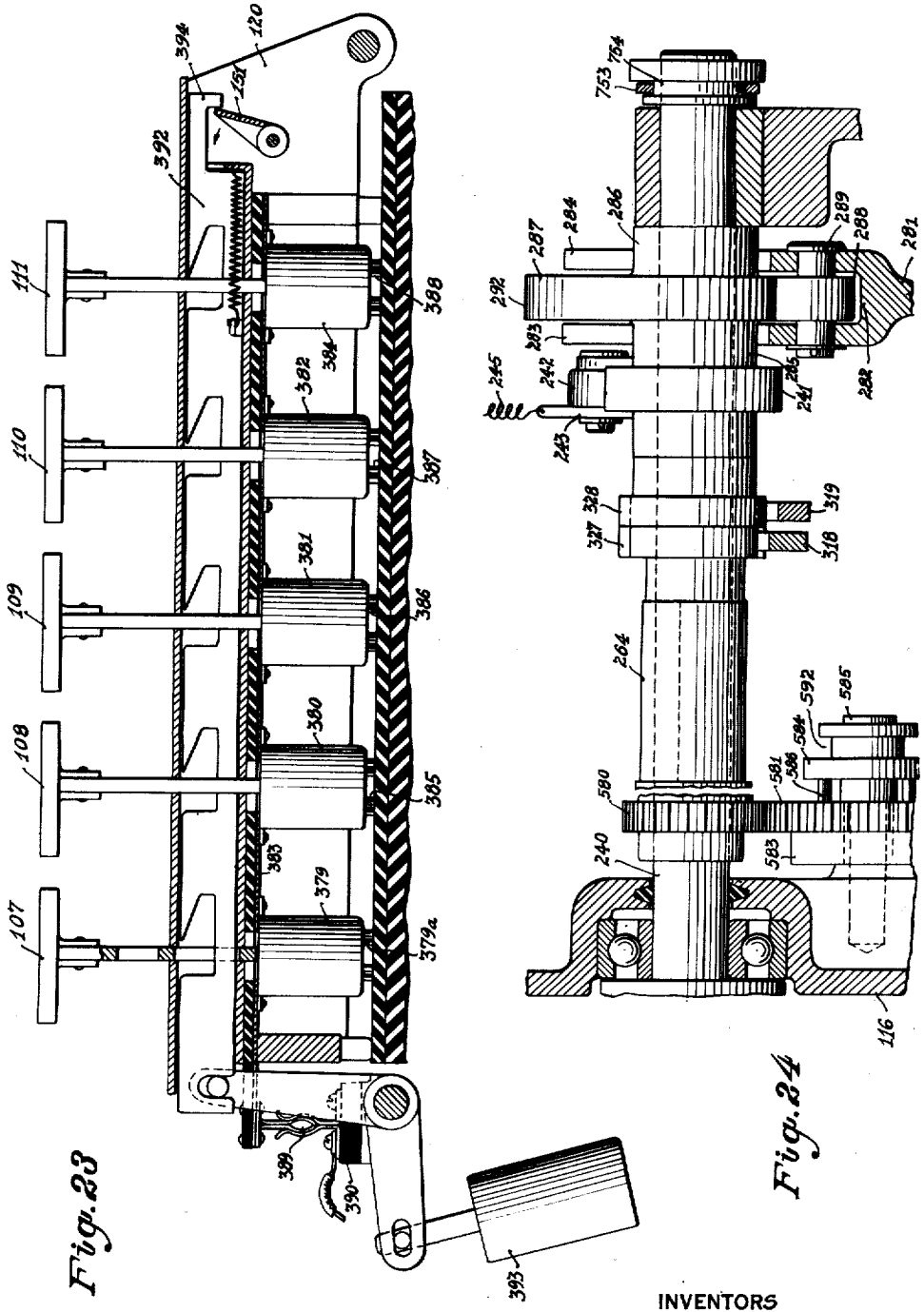

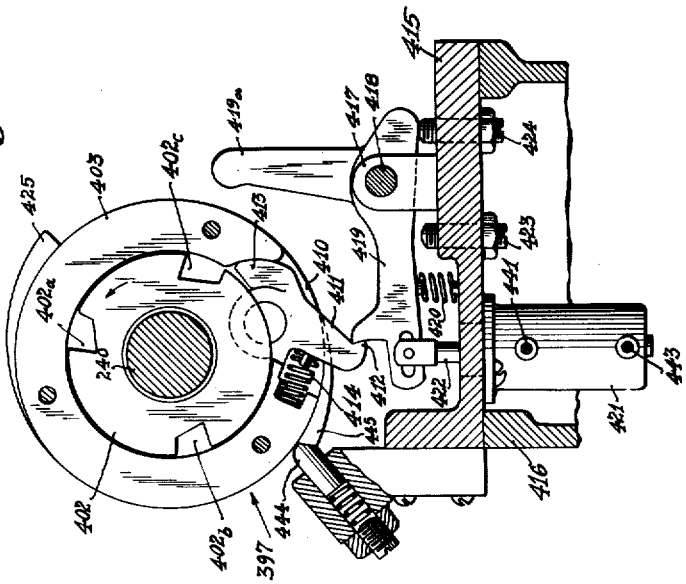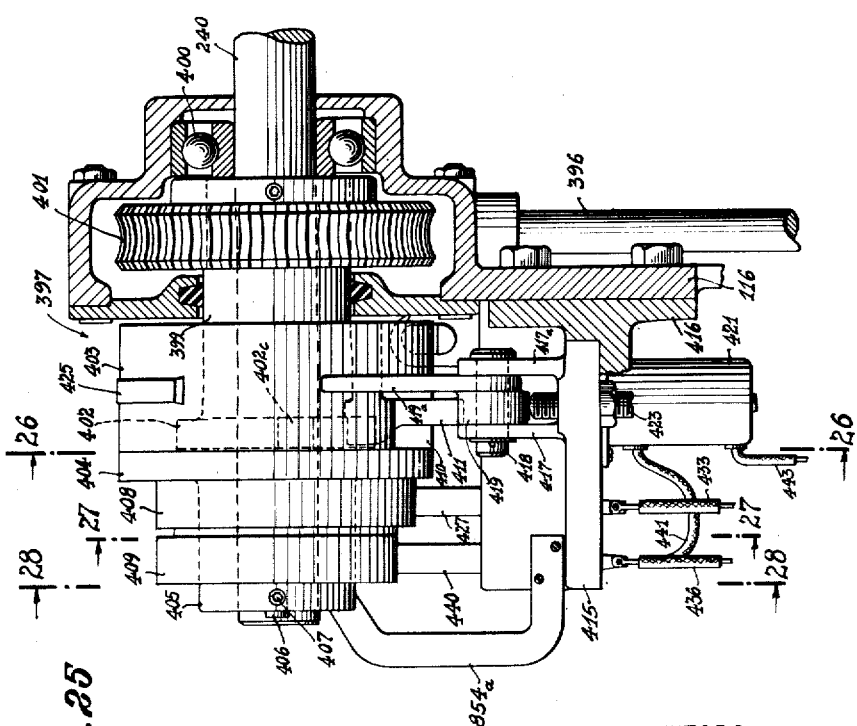

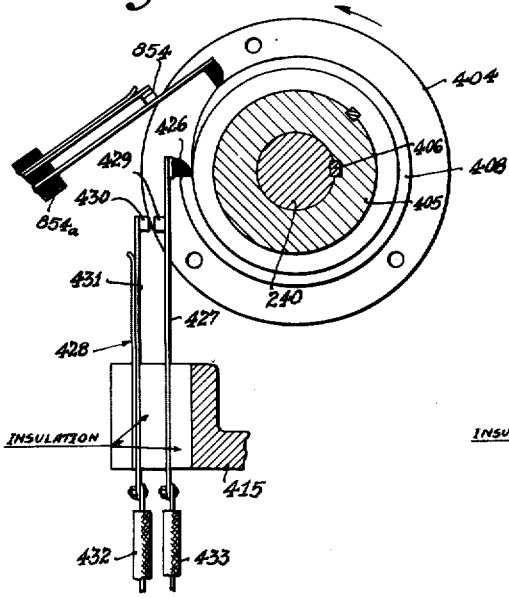
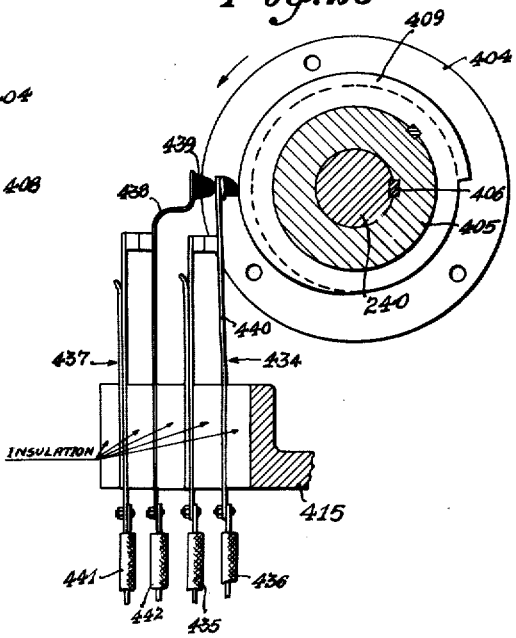
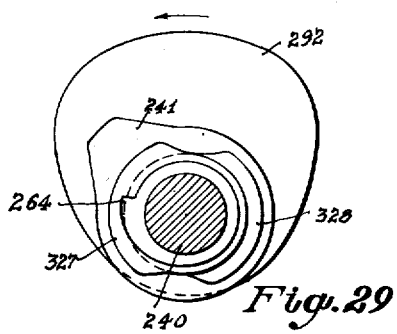
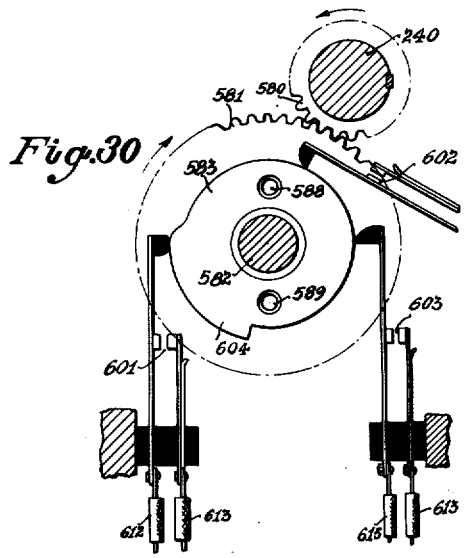
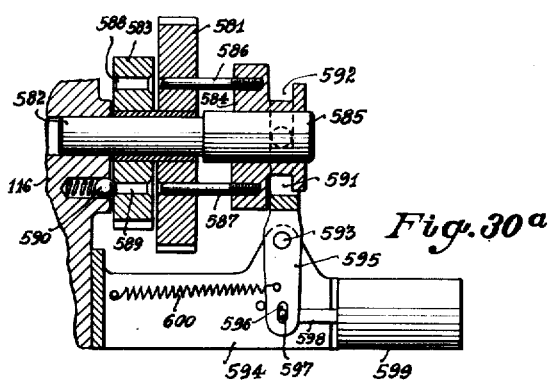

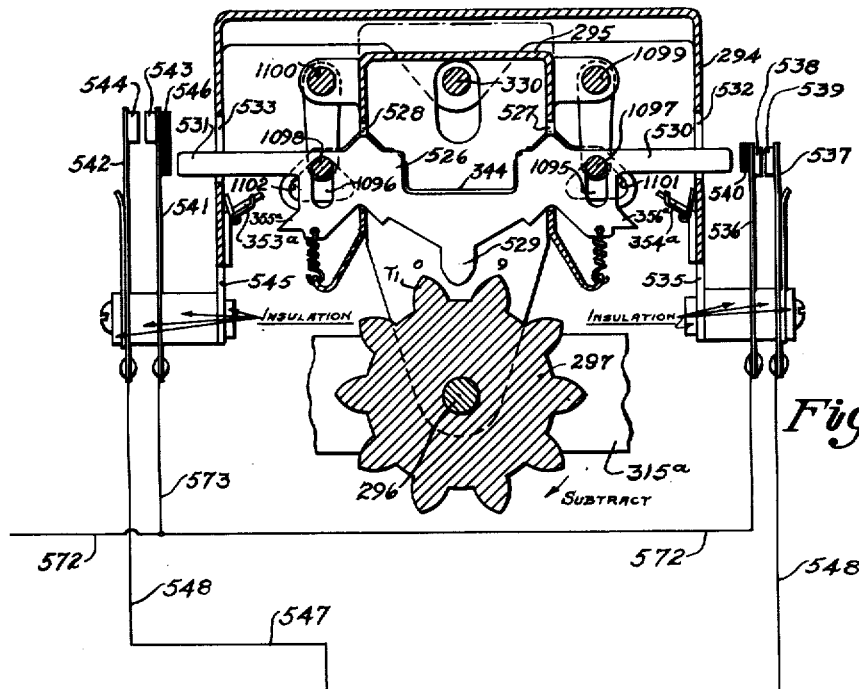
Fig. 31
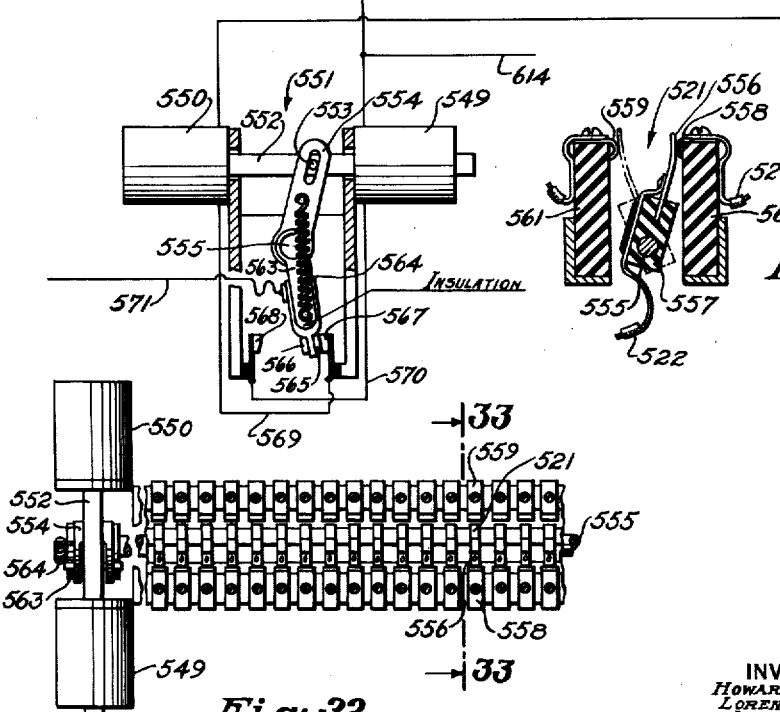
Fig. 33
Fig. 32

Aug. 18, 1942. H. G. FISHACK ET AL 2,293,127
COMPUTING DEVICE
Filed May 3, 1937 22 Sheets-Sheet 14

INVENTORS
HOWARD G. FISHACK
LOREN B. MILLER
BY JOHN J. SHIVELY
ATTORNEY

Aug. 18, 1942.   H. G. FISHACK ET AL   2,293,127
COMPUTING DEVICE
Filed May 3, 1937   22 Sheets-Sheet 15

INVENTORS
HOWARD G. FISHACK
LOREN B. MILLER
JOHN J. SHIVELY
BY
John J. Shively
ATTORNEY

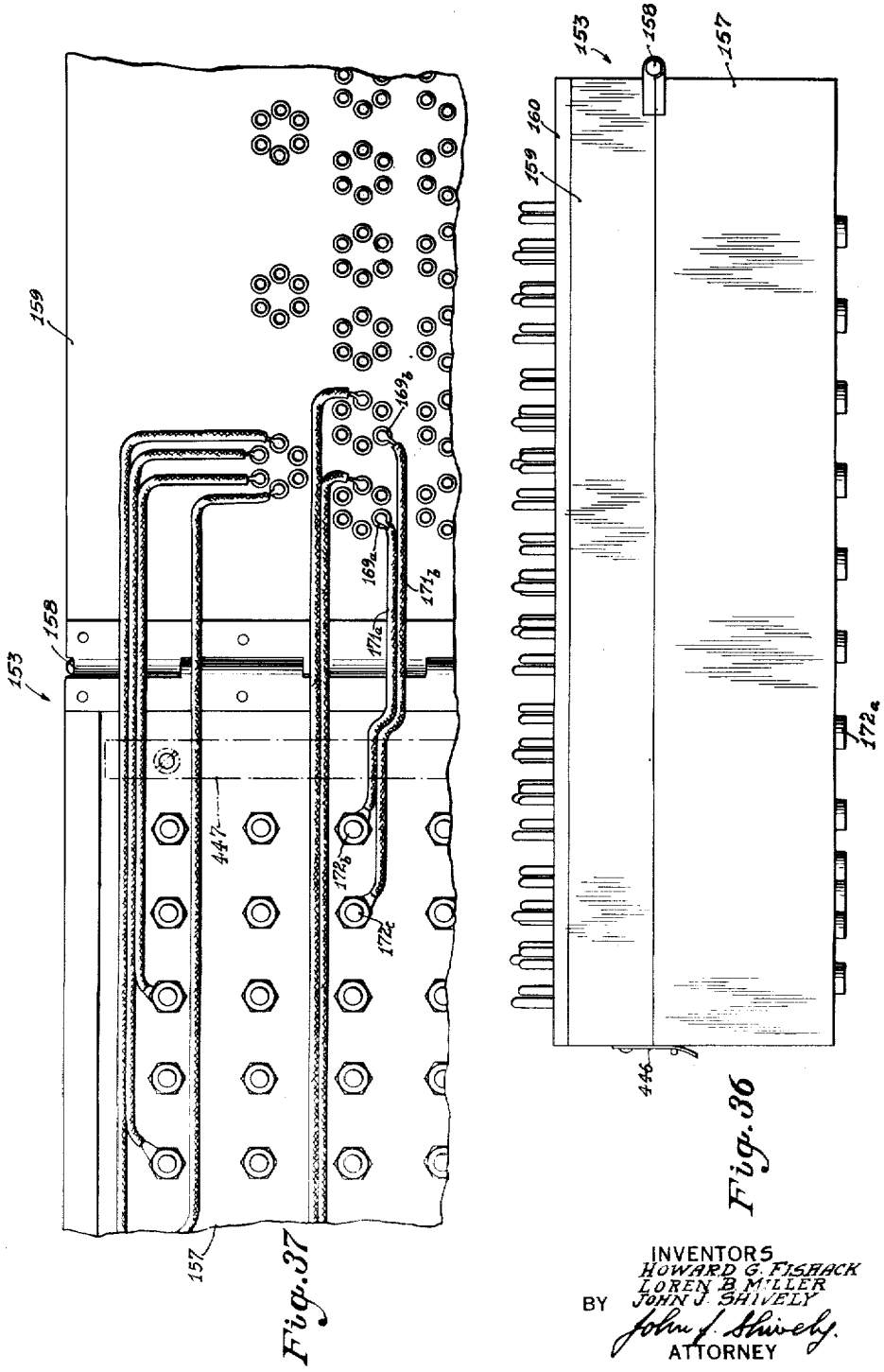

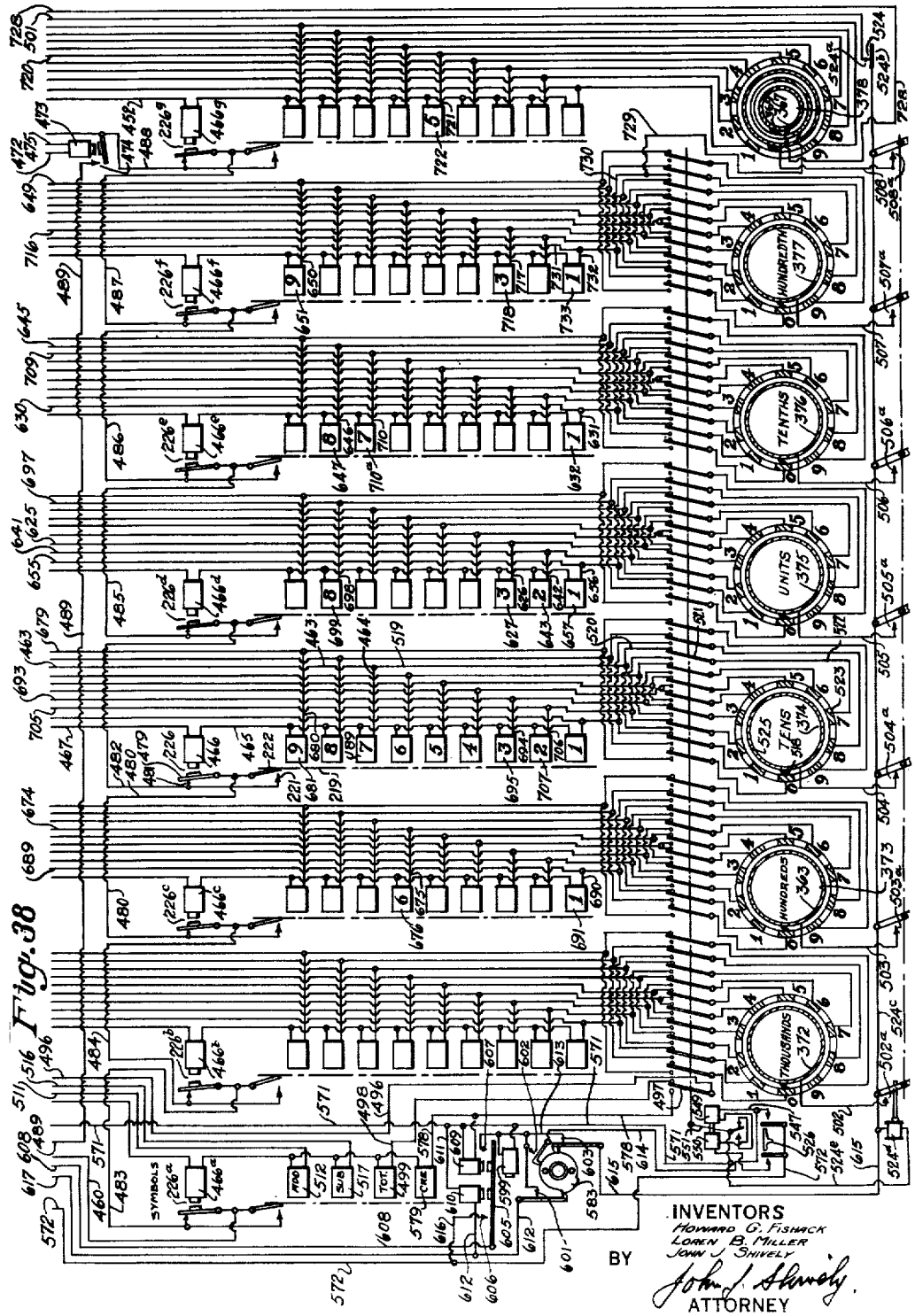

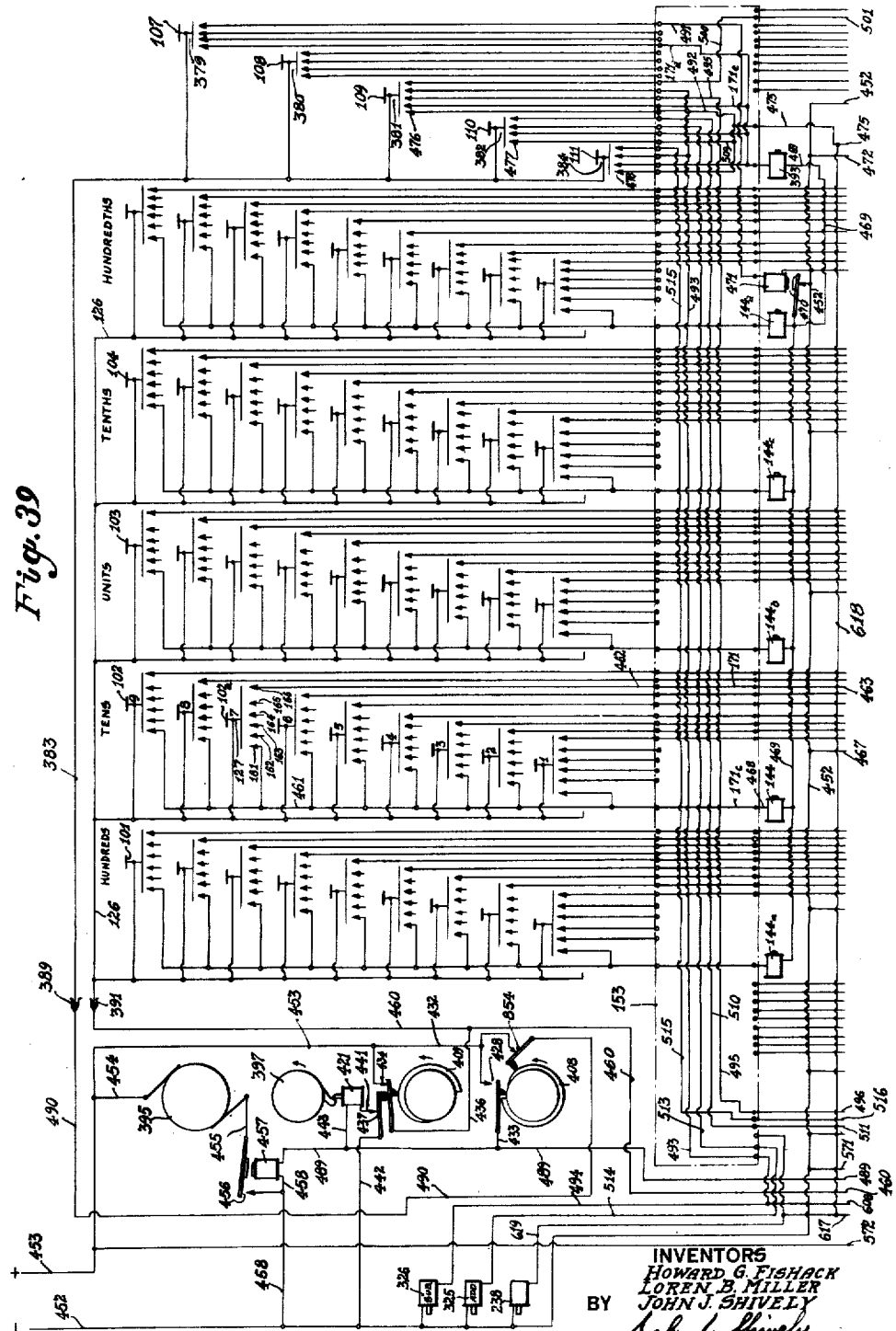

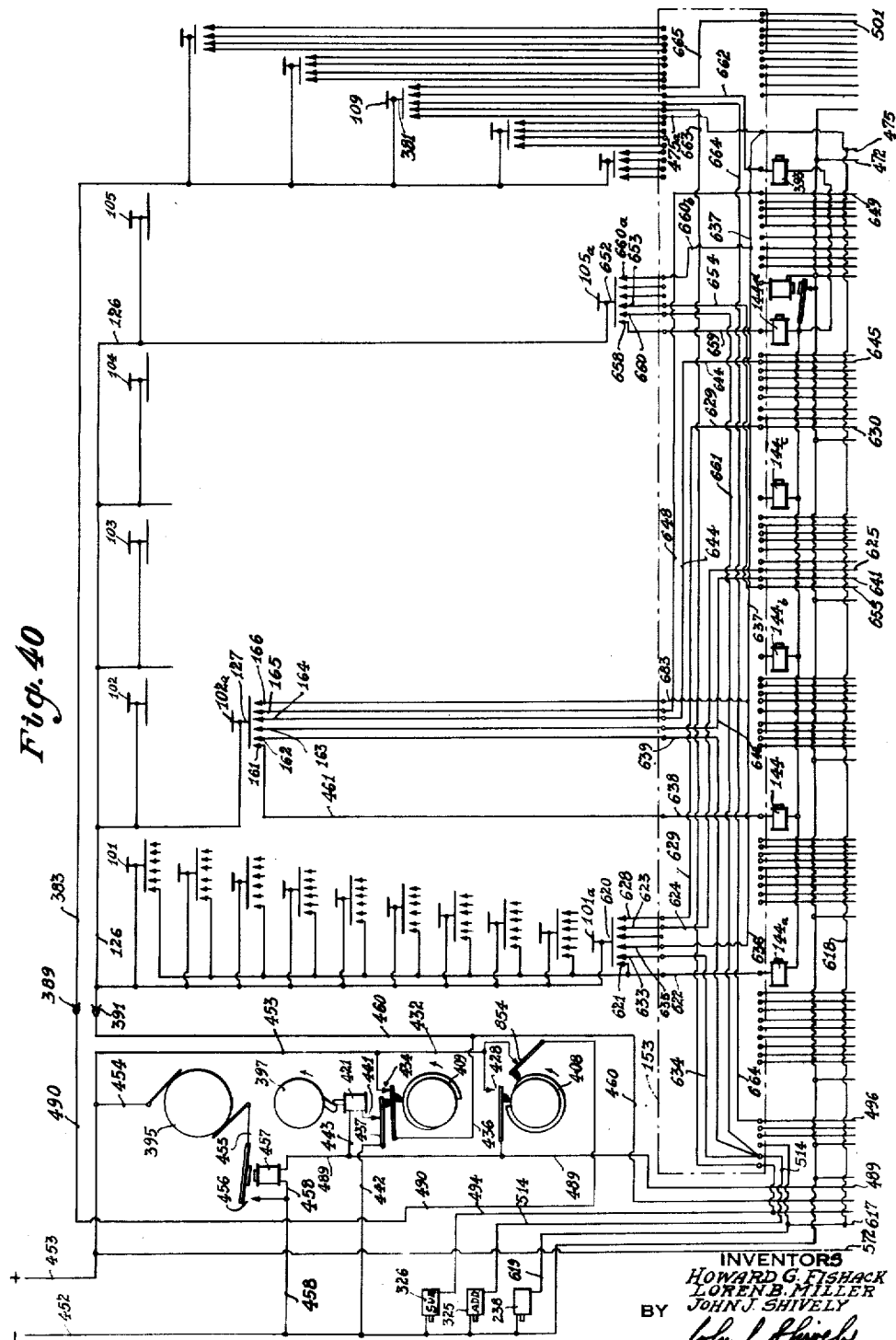

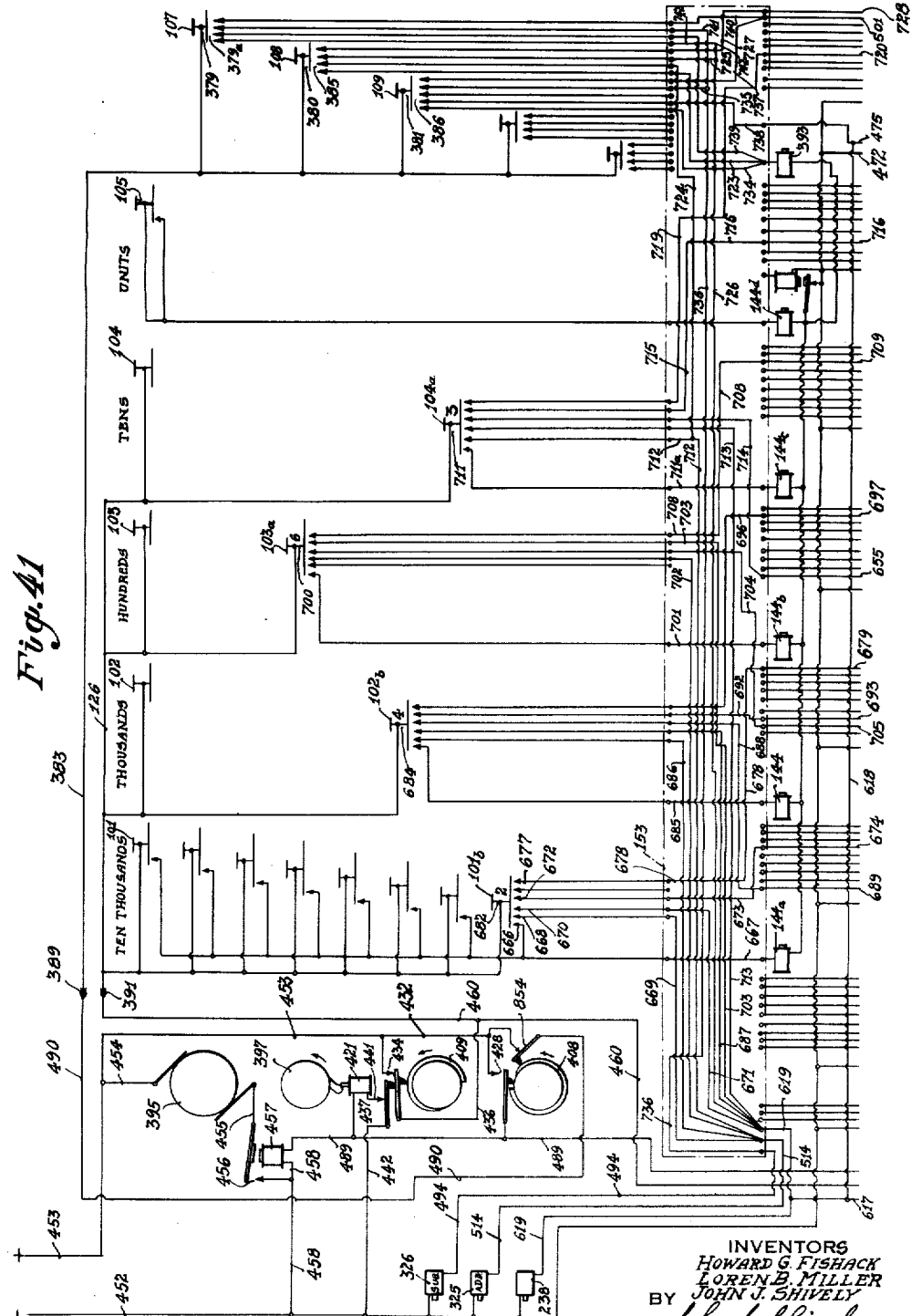

Aug. 18, 1942.    H. G. FISHACK ET AL    2,293,127
COMPUTING DEVICE
Filed May 3, 1937    22 Sheets-Sheet 22

INVENTORS
Howard G. Fishack
Loren B. Miller
BY  John J. Shively.
    John J. Shively
    ATTORNEY Patented Aug. 18, 1942

2,293,127

UNITED STATES PATENT OFFICE 2,293,127

COMPUTING DEVICE

Howard G. Fishack, Wildwood, and Loren B. Miller, Maplewood, N. J., and John J. Shively, New York, N. Y.

Application May 3, 1937, Serial No. 140,354

15 Claims. (Cl. 235—60)

This invention relates to improvements in computing devices.

This application is a continuation in part of application Serial No. 81,157, filed May 22, 1936, entitled Improvements in computing devices.

An object of the invention is to provide a device of the above nature having a detachable structural unit interchangeable with any one of a number of other structural units whereby the machine may be made to perform different orders and types of business functions such as adding, subtracting, tax billing, billing insurance premiums, calculating interest, public utility billing and the like.

Another object is to provide a device of the above type having electrical means to set up and to print quantities entered on keys, or amounts or results computed from the entered quantities.

A further object is to provide means comprising interchangeable permutation panels adapted to receive electrical impulses initiated by the keys and to transfer them to the above electrical means in accordance with the computational function for which each panel is wired.

Another purpose is to provide a permutation panel which may be readily installed in the machine and in which all wiring may be completed separately from the machine itself, as for instance, at a central factory or service station.

Another object is to provide improved accumulating means, including commutators adapted to transmit electrical impulses to the electrical set-up means whereby the computing and printing operations initiated by depression of the keys may be carried through to completion.

A further object is to provide a machine in which the entering of a complete quantity and the printing of a corresponding amount computed in accordance with any predetermined system may be automatically completed following the depression of a single complete quantity key.

Other objects and advantages of the invention will appear in the course of the following description in connection with the accompanying drawings, in which:

Figure 5 is a cross sectional view of a machine embodying the keyboard shown in Figures 1 and 4;

Figure 6 is an exterior perspective view of the same;

Figure 7 is an enlarged sectional view of the keyboard, key switches, locking device and permutation panel in the section shown in Figure 5;

Figure 8 is a similarly enlarged view of the electrical set-up and selecting structures;

Figure 9 is a detail view of a selector detent and related parts;

Figure 10 is a similar view showing a digit nine detent;

Figure 12 is a rear view of the enabling means for printing ciphers;

Figure 13 is a bottom detail view of the lifter tabs, Figure 12;

Figure 14 is a detail view of the mechanism for actuating the bail;

Figure 15 is an enlarged longitudinal view of the counting and commutating device partly in section;

Figure 16 is a cross-sectional view of the same on the lines 16—16, Figure 15;

Figure 17 is a similar view on the lines 17—17, Figure 15;

Figure 18 is a similar view on the lines 18—18, Figure 15;

Figure 19 is a similar view on the lines 19—19, Figure 15;

Figure 23 is a detail view of the error, fraction, total, add and subtract keys, switches and locking mechanism;

Figure 24 is a longitudinal view of the cam shaft;

Figure 25 is a side view of the clutch and breaker mechanism;

Figure 26 is a cross-section of the same on the lines 26—26, Figure 25;

Figure 27 is a section on the lines 27—27, Figure 25;

Figure 28 is a similar section on the lines 28—28, Figure 25;

Figure 29 is a view illustrating the angular relation of the bail, type-release, print, add and subtract cams;

Figure 30 is a detail view of the holding switch mechanism for clearing the counters after printing a negative total such as a credit balance;

Figure 30a is a longitudinal detail section of the actuating means for the breaker, Figure 30;

Figure 31 is a detail view showing the actuating means and relay connections for operating the negative total throw-over switch;

Figure 32 is a fragmental top view illustrating the throw-over switches;

Figure 33 is a cross-sectional view on the lines 33—33, Figure 32;

Figure 36 is a side elevation of the same;

Figure 37 is a fragmental view of the same opened to illustrate the internal electrical connections;

Figure 42:
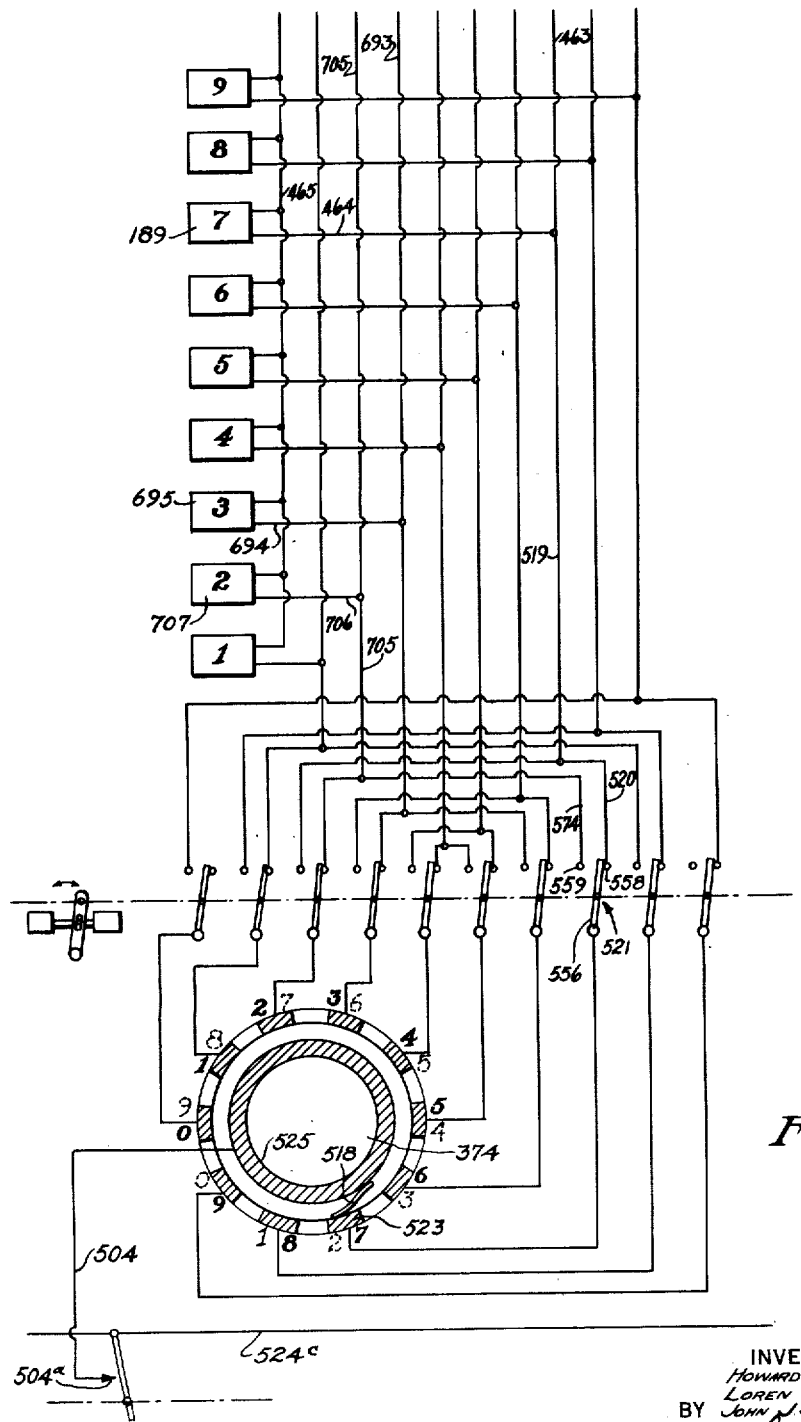
Figures 43, 44:
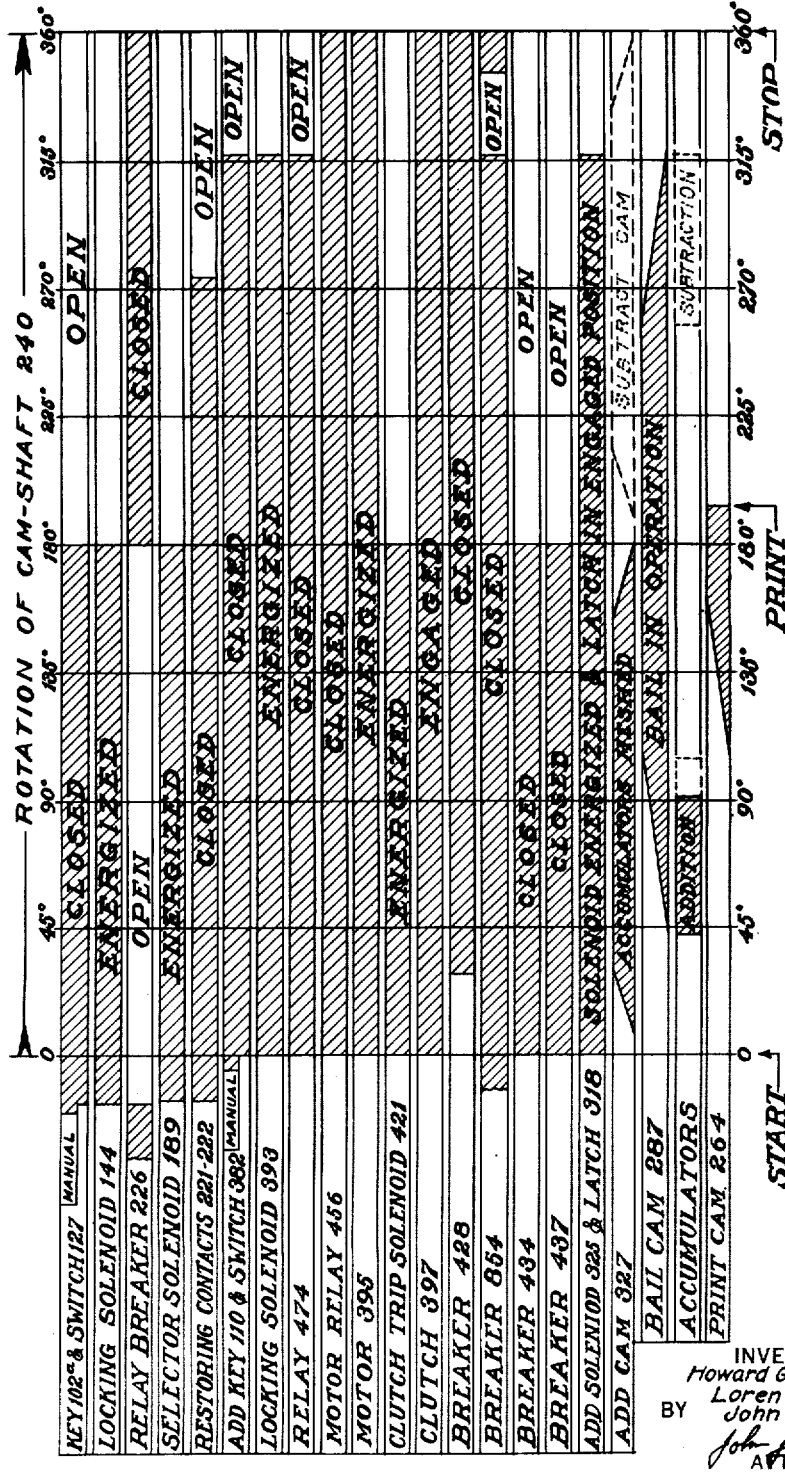

Figures 38 and 39, taken together, form a circuit diagram of the device using a panel wired for straight addition, subtraction and total taking;

Figure 40 is a partial diagram which, when taken with Figure 38, shows the circuits when using a panel wired for percentage computations as in tax billing or calculation of interest;

Figure 41 is a similar partial diagram which, when taken with Figure 38, illustrates the circuits when using a panel wired for computations of amounts according to predetermined tables or formulas by single key operation;

Figure 42 is an enlarged view of a portion of the wiring diagram, Figure 39;

Figure 43 is a fragmental plan view of a group of contact pins;

Figure 44 is a timing diagram illustrating a complete item entering operation of the embodiment set forth diagrammatically in Figures 38 and 39.

Figure 1:
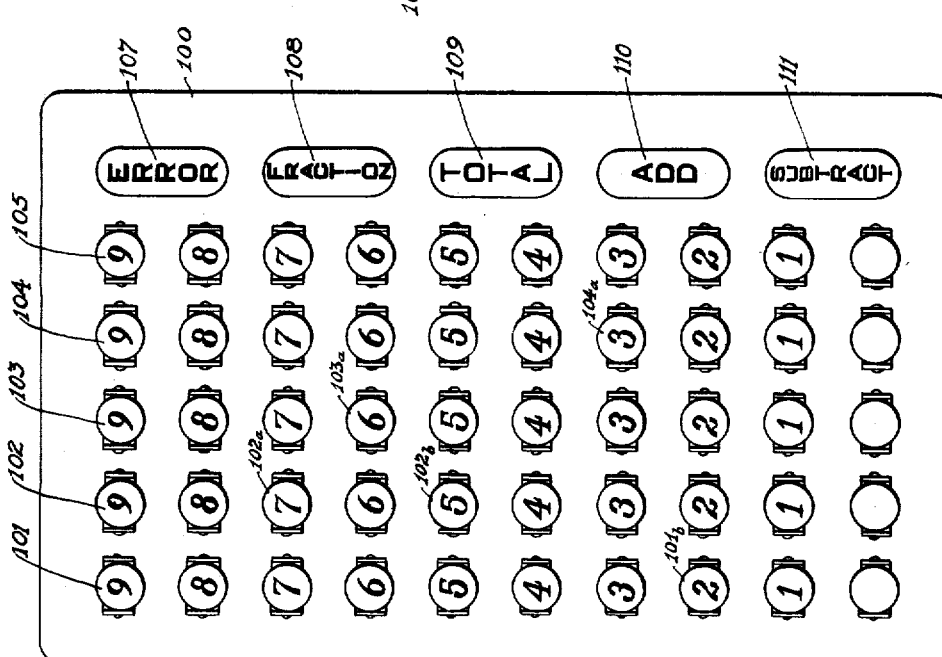
Figure 1 is a plan view of a typical keyboard arranged for straight addition, subtraction, or certain computations such as billing.
Figure 2:
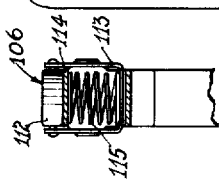
Figure 2 is a detail view of a key having a reversible indicating head.

Referring to Figure 1, a keyboard 100 is provided with five rows 101, 102, 103, 104 and 105 of keys 106, Figure 2, each row comprising ten keys. It will be understood that the machine may be constructed to embody any desired number of rows of keys according to the capacity for which it is designed, the present embodiment being limited to five rows as fully illustrating the construction and operation without unnecessarily complicating the drawings and description.

When the machine is to be used for single digit entries, as in Figure 1, the lower key in each row is a blank, the remaining keys being numbered consecutively from "1" to "9."

At the right side of the keyboard there is provided an error bar 107, a fraction bar 108, a total bar 109, an add bar 110 and a subtract bar 111.

Figure 4:
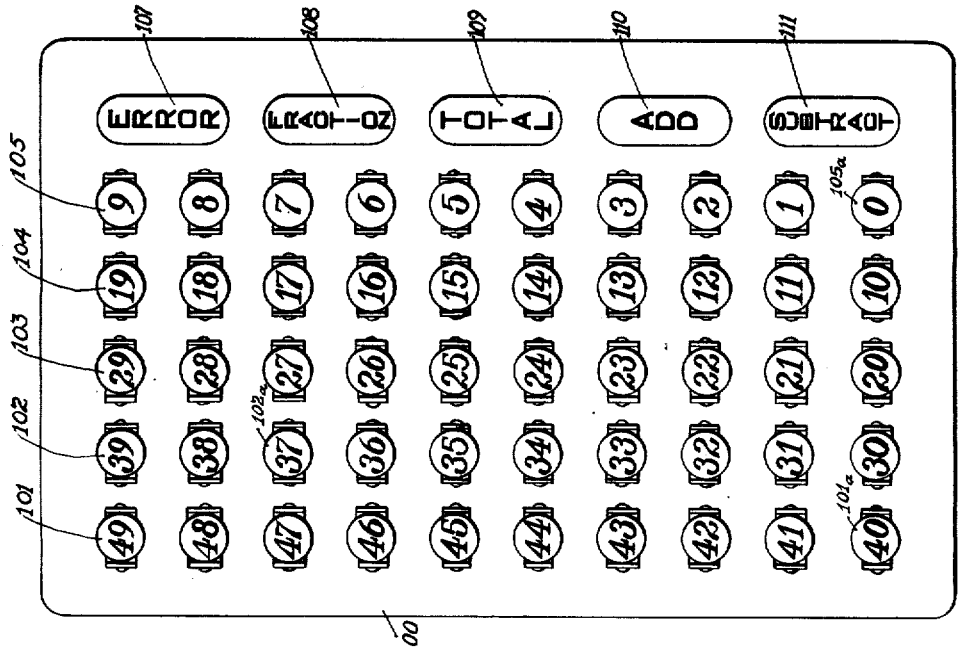
Figure 4 is a view similar to Figure 1 but with the keys arranged as complete quantity keys.

When the machine is to be used for multiple digit or complete quantity key entries, the keys are numbered consecutively from "0" to "49," as shown in Figure 4. In order that one set of keys may be used for both types of entries, and to avoid confusion which may arise if two numbers were marked on the same keyface, the keys 106 may be constructed with reversible heads as shown in Figures 2 and 3.

Referring to Figure 2, the key button 112 is diametrically trunnioned on a U-shaped member 113 slidably guided in a vertical yoke 114. A spring 115 between the bottom of the U-shaped member 113 and the top of yoke 114 normally holds the button 112 flat against the top of the yoke. Single digits as in Figure 1 are marked on one face of button 112, and the complete quantity numbers shown in Figure 4 are marked on the other face.

Figure 3:
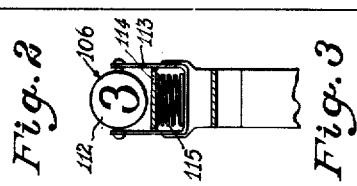
Figure 3 is a view of the same showing the manner of reversing the head.

In changing from one type of numbers to the other, the key button 112 is pulled upward against the pressure of spring 115, as shown in Figure 3, revolved a half turn on its trunnions 113 to expose the opposite face, then released. The spring 115 expands to hold the key button in its new position, as described above. The two faces of the keys are preferably of different colors to facilitate proper changing.

Figure 5:
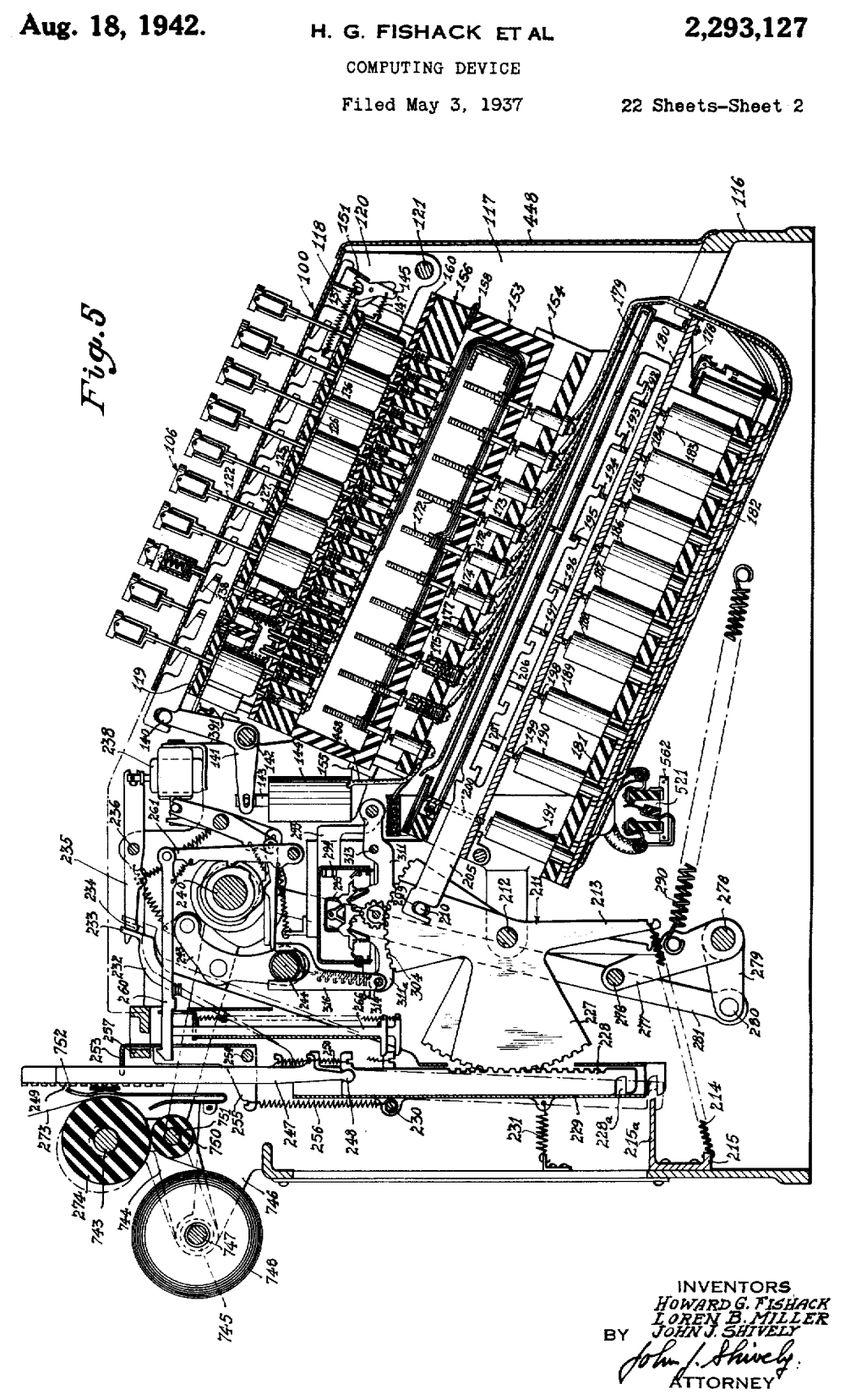

Referring to the general cross-sectional view of the machine shown in Figure 5, a frame or base 116 is provided having upward side extensions 117 at the front end thereof. The keyboard 100 has a top plate 118 and a lower or guide plate 119 secured to side plates 120 which are hinged to extensions 117 by means of a rod 121.

Referring to the enlarged detail drawing, Figure 7, it will be seen that the yokes 114 of keys 106 are secured to flat shanks 122 which are slidably guided in slots 123 and 124 in the plates 118 and 119.

A plate 125 of insulating material is secured to the bottom of the guide plate 119 and a thin conducting plate 126 is in turn secured to the bottom of insulating plate 125. A plurality of switch cylinders 127 are secured to the plate 126 in line with key shanks 122. Hollow conducting pistons 128 are slidably contained in cylinders 127 and are normally urged upward against plate 126 by springs 129. Insulating tips 130 on the lower ends of key shanks 122 bear against the inside of heads 131 of pistons 128. The plates 125 and 126 have openings 132 clearing the shanks 122, so that the latter are insulated from the pistons, cylinders and plate 126.

Each shank 122 has a lower vertical slot 133 and an upper slot 134 separated by a bridge 135. Each row of keys has a common locking bar 136 slidable through the lower slots 133 and normally held to the right by one or more tension springs 137. Upwardly extending longitudinal wedges 138 on the bar 136 are slidable through lower slots 133 of undepressed keys, but are adapted to enter upper slots 134 and engage bridges 135 of depressed keys, as will hereinafter be explained. A vertical slot 139 in the end of bar 136 normally engages a pin 140 in one arm of a bell crank 141 pivoted to base extensions 117 by means of a rod 142, the other arm of said bell crank 141 being connected to the plunger 143 of a stationary solenoid 144.

When a key is depressed, as shown in Figure 7, and the solenoid 144 energized in a manner hereinafter explained in connection with the wiring diagram, the bar 136 is drawn to the left, the lower inclined edge of the wedge 138 engaging the bridge 135. If the key is fully depressed, the wedge holds it depressed as long as the solenoid 144 is energized. If the key is only partially depressed, as a circuit is established through the solenoid, the movement of the wedge forces the key downward to its fully depressed position where it is held as previously noted. When the bar 136 moves, as described, to lock one key in lower position by action of one wedge, the other wedges enter the lower slots 133 of the other key shanks, thus underlying the bridges 135 and preventing the other keys from being depressed.

By the above means it will be noted that depressing one key in a row locks the remaining keys from being depressed.

A row of stop levers 145, one opposite the right or front end of each locking bar 136, is pivotally attached to side plates 120 by means of a rod 146. Each lever 145 is urged clockwise by a tension spring 147 and has a toe 148 adapted to extend upward through a slot 149 in the guide plate 119 between the right end of bar 136, and a transverse stop plate 150. A flat transverse member 151, also hinged at its ends on the rod 146, is adapted to engage upward extensions 152 of levers 145 to rock the latter counter-clockwise and withdraw the toes 148 through the slots 149 for a purpose hereinafter explained.

Referring again to Figure 7, a permutation panel 153, shown in further detail in Figures 34, 35, 36 and 37, is supported in brackets 154 and 155 formed on or otherwise secured to the base 116. The permutation panel 153 consists of an upper portion 156 and a lower portion 157 preferably hinged together at 158. The upper portion 156 comprises an insulating block 159 covered by an insulating plate 160 which underlies the bottom of the switch pistons 128.

Figure 34:
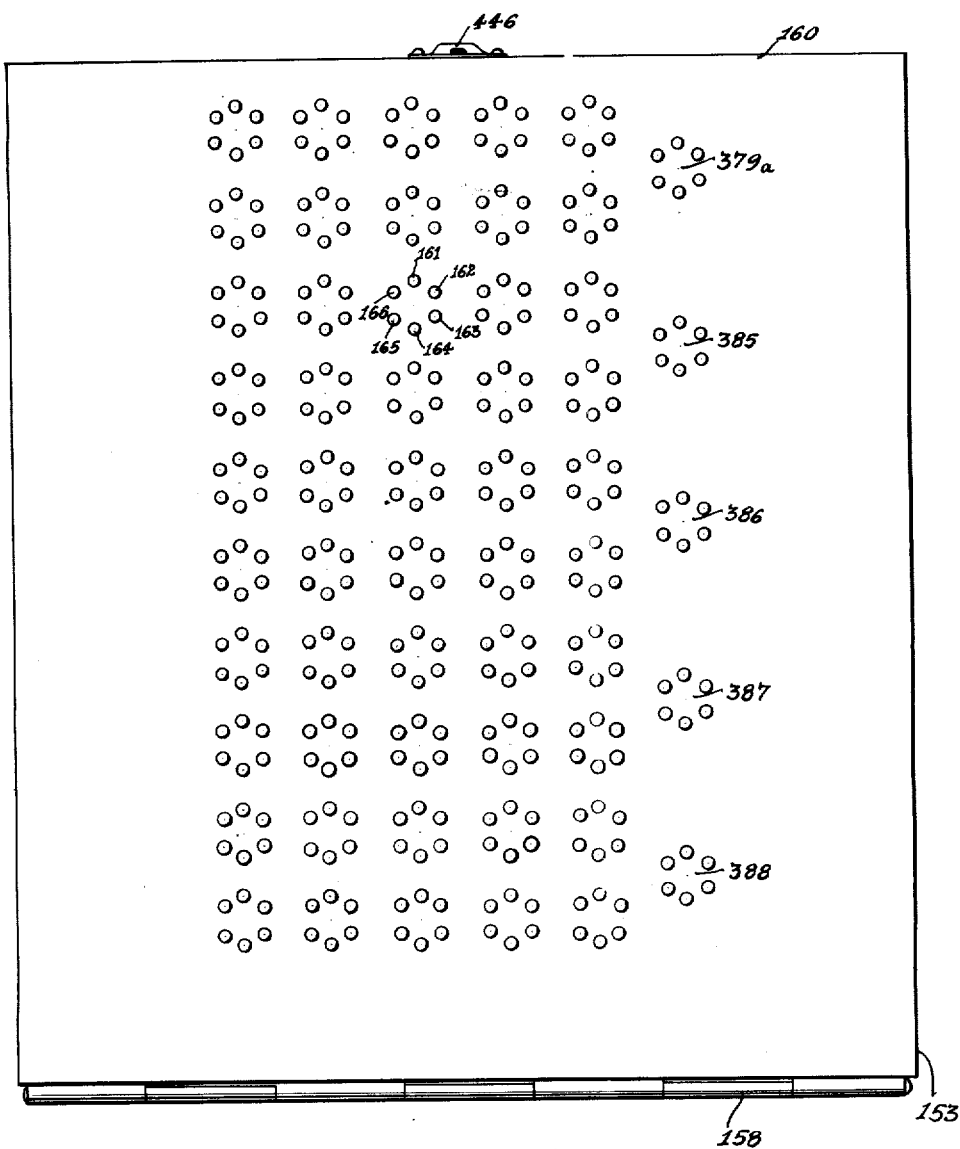
Figure 34 is a top view of a typical permutation panel.

Directly under each piston 128 is a group of pins such as 161, 162, 163, 164, 165, 166, shown in Figures 7 and 34, slidably retained in holes 161 in the block 159 and urged upward by springs 168 backed by sleeves or jacks 169 secured in the bottom of holes 167.

The jacks 169 are individually connected by means of pins 170 and leads 171 with threaded posts 172 disposed in an insulating plate 173 forming the bottom of the lower portion 157 of the permutation panel 153. The connections between the various jacks 169 and posts 172 determine the type of computation which the machine is set up to perform, and the arrangement and manner of making these connections will be hereinafter explained in greater detail.

Referring to Figures 5, 7 and 8, the heads 172a of posts 172 bear against pins 174 slidable in sleeves 175 and urged upward by springs 176. The sleeves 175 are secured in an insulating plate 177 fastened to the bottom of brackets 154 and 155.

A chassis 178, comprising an upper plate 179, a second plate 180, a solenoid plate 181 and a stop plate 182, is upwardly secured to the base 116 below the insulating plate 177. Selector solenoids are secured to plate 181 in spaced relation, there being nine solenoids per row, corresponding to digits "1" to "9" reading from the right in Figures 5 and 8 and indicated respectively by numbers 183 to 191 inclusive.

Above each solenoid is a selector detent, the nine detents in each row being indicated by numerals 192 to 200 inclusive, in respective correspondence to the solenoids 183 to 191 noted above. The detents are slidable in slots in the plates 179 and 180, and are adapted to be pushed upward by plungers 201, 201a, 201b, 201c, 201d, 201e, 201f, 201g and 201h, in their respective solenoids.

Taking detent 197 as typical of all detents corresponding to digits "1" to "8," it will be seen in Figure 9 that the detent has therein two aligned vertical slots 202 and 203 separated by a bridge 204. A selector bar 205, slidable between the plates 179 and 180, has an upper rail 206 extending through the slots 202 in detents 192 to 199 and a lower rail 207 running through slots 203.

The number "9" detent 200, as shown in Figure 10, has a single slot 208 through which the bar 205 extends. The rear or left end of bar 205, as shown in Figure 5, has a vertical slot 209 embracing a pin 210 in a segmental plate 211 rotatably mounted on a stationary rod 212 secured to the base 116. A downward extension 213 of the plate 211 is urged to the left by a tension spring 214 secured by means of an angle 215 to the base 116. The spring 214 thus tends to revolve the plate 211 clockwise and thereby forces the selector bar 205 to the right.

The upper rail 206 of the bar 205, Figure 8, has extending downward therefrom a series of hooks 216, 216a, 216b, 216c, 216d, 216e, 216f and 216g normally slidable through the upper slots 202 of the selector detents, but adapted to engage and embrace the bridges 204 when the detents are raised. The spacing of the hooks is such that when any detent is raised by its solenoid and the bar 205 moved to the right, a hook engages the bridges 204 of the detent to stop the bar after permitting the latter to travel a distance substantially proportional to the value of the digit corresponding to the raised detent. In other words, if detent 192, corresponding to the digit "1," is raised, the hook 216 will engage detent 192 after allowing the bar to travel a certain distance, while if digit "4" detent 195 is raised the hook 216c encounters the detent 195, as shown in Figure 8, to stop the bar 205 after it has moved to the right a distance substantially four times that permitted by the digit "1" detent.

The bar 205 is provided with an upper notch 217 in which the upper edge of slot 208 of detent 200 normally rests. Thus, when detent 200 is in its lower position, that is engaging the notch 217, the bar 205 is restrained from moving to the right. If detent 200 is raised by solenoid 191 alone, the bar 205 is allowed to move to the right until stopped by the end 218 of chassis 178, the distance travelled being sufficient to set up the digit "9" in the machine.

It is evident from the foregoing that when any detent corresponding to a digit less than "9" is raised, it is also necessary that detent 200 be raised in order to release the notch 217 and allow the bar 205 to be moved. For this purpose, a rocker 219 is provided, hinged at both ends to chassis 178 and overlying all detents except detent 200, as shown in Figure 8. The rocker 219 engages a notch 220 in detent 200, as shown in Figure 10.

When any detent below the digit "9" is raised it rocks rocker 219 upward and the latter raises detent 200, to disengage it from the notch 217. If detent 200 is raised by solenoid 191, in order to set up the digit "9," rocker 219 is also raised but does not affect the other detents. In other words, when detent 200 is actuated by solenoid 191 it acts alone to allow the digit "9" to be set up, while if any other detent is raised by its solenoid the detent 200 is also actuated as a bar release.

Two cooperative contact members 221 and 222 are secured in insulating blocks 223 and 224 attached to the chassis 178 in such position as to overlie the top of digit "9" detent 200. The contacts normally stand apart, but when the detent 200 rises it engages an insulating pad 225 on the lower contact member 222 to raise the latter into contact with member 221 as shown in Figures 8 and 10. Mounted at the front end of each row of solenoids is a normally closed relay 226 adapted to break quickly when its coil is energized.

The segmental plate 211 has a rearwardly extending segment 227, Figure 5, normally meshing with a vertical rack 228. The rack 228 is slidable vertically in a guide 229 rockably mounted on a stationary horizontal rod 230. A tension spring 231 urges the guide 229 clockwise, thus tending to draw the rack 228 out of mesh with segment 227. The guide 229 has an upwardly extending arm 232 terminating in a fork 233, shown in enlarged detail in Figure 11, which engages a stop 234 on a release rocker 235, pivoted to the supporting frame of the machine at 236. The rocker 235 is urged into engaged position with fork 233 by a spring 237, while a solenoid 238 has a plunger 239 coupled to the right end of rocker 235 and adapted to rock the stop 234 upward out of engagement with the bottom of fork 233 when the solenoid is energized.

A cam shaft 240, shown in detail in Figures 24 and 29, carries a cam 241 adapted to engage a roller 242 on the end of a lever 243 pivotally mounted at 244. A spring 245 urges roller 242 against the cam.

Figure 11:
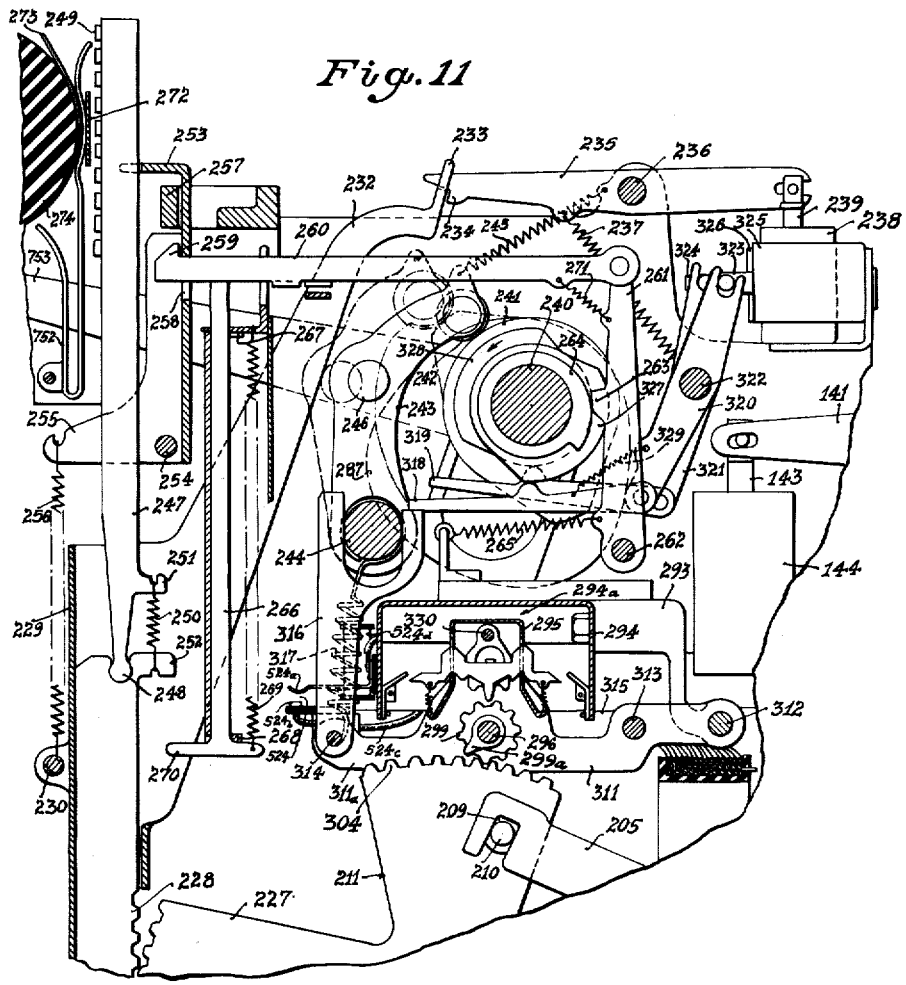
Figure 11 is an enlarged sectional view showing the cam-shaft, type controls and adjacent parts.

When the device is in rest, or starting position, the cam 241 holds the lever 243 to the left as shown in dot and dash lines, Figure 11, causing a pin 246 in lever 243 to engage arm 232 and hold fork 233 slightly free of stop 234 to the left. If solenoid 238 be energized to raise the stop 234 clear of the bottom of fork 233, as the shaft 240 revolves and the lever 243 rocks to the right, Figures 5 and 11, spring 231 causes the arm 232 also to follow to the right. The spring 231 is thus enabled to swing the guide 229 to the left to draw the type rack 228 out of mesh with the segment 227, as shown in dot and dash lines, Figure 5. It is evident from the above that release rocker 235 normally holds the rack in mesh, but if the solenoid 238 be energized, the rack 228 will drop out of mesh as the shaft 240 starts to revolve.

A type bar 247 is pivoted at 248 in the top of rack 228 and carries a column of type 249 adapted to print digits "0" to "9," inclusive, the "0" digit being at the top of the column. A light tension spring 250, disposed between small angular hooks 251 and 252 on rack 228 and bar 247 respectively, normally urges the bar 247 to the right against a forked hammer 253. The hammer 253 is pivoted on a stationary rod 254 and has an arm 255 extending toward the back of the machine. A relatively strong tension spring 256, disposed between arm 255 and rod 230, normally holds the hammer 253 firmly against a stationary stop bar 257 secured to the machine frame 116.

The hammer 253 has therein a slot 258, Figure 11, in which is disposed an upwardly directed hook 259 on the end of a draw link 260. The link 260 is pivoted to the upper end of a lever 261 swung on a stationary rod 262 and having a step 263 urged into engagement with a print cam 264 by means of a spring 265. It will be understood that each type bar is provided with a hammer 253, link 260, and lever 261, all the levers 261 however being pivoted on the single rod 262 and being operable by the single wide-faced cam 264. The relationship of the individual print bars, with their respective links and hammers is further illustrated in Fig. 12 as hereinafter set forth.

A lift bar 266, slidable in upper and lower guide combs 267 and 268, is disposed vertically in front of the type bar 247 and with its upper end under the link 260. The bar 266 is urged upward by a spring 269 and has a lower foot 270 underlying the hook 252 on the rack 228. When the rack 228 is drawn down to its lower position, the hook 252 depresses the foot 270, thus lowering the bar 266 and allowing the link 260 to drop so that the hook 259 may idle in the bottom of slot 258 in the hammer 253 when reciprocated by the print cam 264. A light spring 271, connecting the link 260 and the lever 261, assists gravity in dropping the hook 259 quickly to the bottom of the slot.

When the type rack 228 is raised by the segment 227 to set up the type 249 as shown in Figure 11, the hook 252 on the rack releases the foot 270. The lift bar 266 is moved upward by the spring 269, raising the link 260 so that as the link 260 is retracted to the right, the hook 259 engages the hammer 253 above the upper edge of the slot 258. The hammer 253 is thereby drawn or cocked to the right against the tension of the spring 256, the type bar 247 also being rocked to the right by its spring 250. When the cam 264 over-runs the step 263 on the lever 261, thereby releasing the latter and the link 260, the spring 256 snaps the hammer 253 and the type bar 247 sharply to the left. The hammer 253 is stopped by the bar 257 but the type bar, due to its momentum, continues its movement to the left until stopped by its type encountering an inked ribbon 272 in front of a paper strip, or bill blank 273 backed by a platen 274.

By the action described, the type digit set-up in line with the ribbon prints its figure on the paper, after which the spring 250, together with the rebound of the type, retracts the type bar to vertical position, as shown in Figures 5 and 11.

From the foregoing description it is evident that the lift bar 266 can normally lift the hook 259 to engage the hammer 253 and cause the type bar to print only when the latter has been moved upward from its lowest or "0" position.

In order to prevent the rack 228 from being drawn upward by the spring 269 and lift bar 266, Figure 11, when the rack is disengaged from the segment 227, a notch 228a is provided in the back of the rack near its lower end, as shown in Figure 5. When the rack 228 is swung clear of segment 227, as shown in dot and dash lines, Figure 5, the notch 228a engages an extension 215a of the angle member 215 which restrains the rack from upward movement until it has been returned into mesh with the segment 227.

Since it is normally desired to print all zero figures to the right of any greater printed figure, the following provision is made to enable the print bars to print in "0" position:

Figure 12 is a rear detail view of the upper parts of the various print bars and related parts in which the numeral 247a denotes the extreme left type bar carrying multiple type rows adapted to print, for instance, "Add," "Sub" (denoting subtract), "Tot" (signifying total), and "Cre" (signifying negative total or credit balance). The second type bar 247b carries digits of thousands denomination, 247c the hundreds denomination, 247 carries digits in the tens denomination and 247d the units denomination. Bar 247e carries the decimal point and tenths digits, while 247f carries the hundredths digits. The hammers, hooks, lift bars, etc., relating to the various type bars are denoted by the numerals assigned these parts in the description relating to the type bar 247 with the addition of the respective alphabetical symbols assigned to various type bars noted above.

The links 260a, 260b, 260c, 260, 260d and 260e have formed thereon tabs 275a, 275b, 275c, 275, 275d and 275e extending horizontally to underlie in each case the next link to the right, adjacent tabs being staggered as shown in Figure 13. The hundredths link 260f carries a similar tab 275f extending to the left to underlie the tenths link 260e.

When any type bar, for instance bar 247, is raised above its "0" position, as shown in Figures 5, 11 and 12, the link 260 is raised by the lift bar 266 as already described. The tab 275 raises the link 260d to enable the hammer 253d. Similarly, the tab 275d raises the link 260e. Thus, when on any type bar any digit above "0" is set up all type bars to the right thereof are enabled to print zeros.

When a digit above zero is set up, only in the hundredths column, that is on bar 247f, it is desirable also that the decimal point and tenths zero also be printed. In this case, when the link 260f is raised, its tab 275f raises the link 260e to allow the hook 259e to cock the hammer 253e in the manner previously described.

A bail 276 on arms 277, Figures 5 and 14, secured to a longitudinal bail shaft 278, is disposed behind and spanning the downward extensions 213 on the segmental plates 211. The bail shaft 278 is rockably journalled in the base 116 and carries a lever 279 to which is pivoted at 280 a push rod 281. The upper end of push rod 281, shown in Figures 14 and 24, terminates in a fork 282 having slotted side plates 283 and 284 respectively guided on the hubs 285 and 286 of a bail cam 287 secured on the cam shaft 240. A roller 288 is rotatably mounted on a pin 289 in the bottom of the fork 282.

A strong tension spring 290, Figures 5 and 14, attached at one end to a pin 291 on one of the arms 277 and at the other end to the base 116, urges the bail assembly clockwise and holds the roller 288 in engagement with the periphery of the bail cam 287. In normal or initial position, as illustrated in Figure 14, the bail 276 holds the segmental plates 211 in their extreme counter-clockwise position. When the shaft 240 is revolved, the lobe of the cam 287 acting through the roller 288 forces the push rod 281 downward to swing the bail counter-clockwise against the tension of the spring 290. If any selector bar 205 has meanwhile been released by the raising of the detent 200 in the manner previously described and shown in Figure 9, the spring 214 causes the extension 213 to follow the bail to the left, allowing the plate 211 to swing clockwise, normally raising the type bar 247. This movement continues until one of the hooks, such as 216c, Figure 8, engages its detent 195 which stops the bar 205 to hold the connected parts in position wherein the type digit corresponding to detent 195 is set up in line with the platen 274. This position is maintained until the descent of roller 288 from the lobe of cam 287 allows the strong spring 290 to return the bail 276 to the right. As the bail moves to the right it re-engages the extension 213 to return the selector bar and type bar to initial or "0" position.

From the above, it will be understood that the movement of the bail allows all released selector bars to move into positions determined by their respective detents, allows the parts to remain in this position while the outer circumferential surface 292 of the lobe of cam 287 traverses the roller 288, then picks up and returns all the selectors and attached parts to initial position, the strong spring 290 overcoming all the weaker springs 214.

A stationary bracket 293, Figures 5 and 11, has secured thereto the casing 294 of an accumulator assembly generally denoted by the numeral 294a and further shown in enlarged detail in Figures 15, 16, 17, 18, 19, 20, 21, 22 and 31. A movable frame 295 is positioned inside the casing 294 and supports a longitudinal shaft 296 on which are rotatably mounted accumulator gear wheels 297, 298, 299, 300, 301, 302 and 303 disposed above and adapted to mesh with gear segments 304 on the plates 211, Figures 5 and 11. The wheels each have 10 teeth and the wheel 297 is of double width for a purpose hereinafter described. The remaining wheels 298, 299, etc., have formed thereon cams 298a, 299a, 300a, 301a, 302a and 303a respectively, Figure 15, the cams preferably being in the form of widened single teeth of the wheels. The wheels have extended hubs as shown at 298b, Figures 15, 16 and 17, and at 303b, Figures 15, 18 and 19. The hubs of the various wheels extend respectively into hollow shells 534, 305, 306, 307, 308, 309 and 310 made of non-conducting material such as Bakelite and having laterally extending arms 311 and 311a, the arms 311 being rockable on a rod 312 secured to the bracket 293, Figures 5 and 11. Bolts 313 and 314 through the arms 311, 311a and through cross strips 315 and 315a welded or formed on the frame 295, secure these parts together in a unit, the assembly being rockable on the rod 312 to move the gear wheels into or out of mesh with the gear segments 304.

A vertical fork 316, pivotally mounted on the bolt 314 spans the shaft 244 and is slidably guided thereby. A tension spring 317 attached to the bolt 314 and shaft 244, urges the counter assembly and fork 315 upward.

A pair of tappet levers 318 and 319, Figure 11, are pivoted to the lower end of rocker arms 320 and 321 fulcrumed on a stationary rod 322. The upper ends of arms 320 and 321 are attached to the plungers 323 and 324 of horizontal solenoids 325 and 326, hereinafter referred to as add and subtract cam solenoids respectively.

A pair of cams 327 and 328 on the shaft 240, hereinafter referred to as the add and subtract cams respectively, engage the tappet levers 318 and 319 respectively, the lobes of the cams being set at 180 degrees from each other so that during a complete revolution of the shaft 240 the cams rock the tappets downward alternately.

With the shaft 240 starting counterclockwise from normal rest position, shown in Figure 29, the add cam 327 first rocks the tappet 318 downward against the tension of a small spring 329, holds the tappet down throughout the greater part of 180 degrees of revolution, then allows it to return to upper position at the half-way mark. During the second half of the revolution the subtract cam 328 actuates the tappet 319 in the same manner.

If the solenoid 325 is energized previously to the starting of the shaft 240, the retraction of plunger 323 thrusts the tappet 318 forward so that its end overlies the upper part of the fork 316. When the shaft 240 then revolves to rock the tappet 318, the latter engages the fork 316 to rock the accumulator assembly downward against the tension of the spring 317, thus placing the accumulator gear wheels in mesh with the segments 304 during the first half revolution of the shaft. As the bail 276 makes its counterclockwise motion during the first half of the above revolution, as previously explained, it will be seen that any clockwise motion of the plates in setting up numbers causes a counterclockwise rotation of the counter gears, by which means the numbers are "stored" in the accumulators, the pitch radius of the segments 304 being such that the angular movement thereof in setting up each digit moves the corresponding accumulator wheel the number of tenths of a revolution corresponding to the digit's denomination.

If solenoid 326 is energized, the accumulator wheels are similarly placed in mesh with segments 304 during the second half-revolution, that is, while the plates 211 are returned to their initial position, the accumulator gears being thereby revolved clockwise. The latter operation takes place during subtraction or in clearing the accumulators as hereinafter described.

Figure 20:
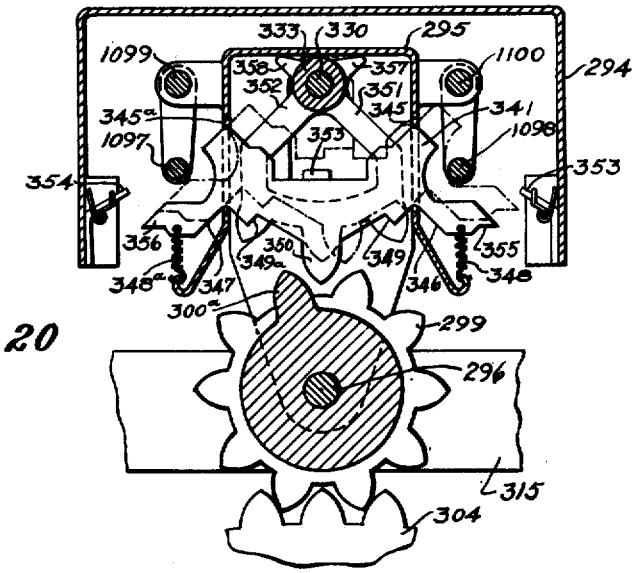
Figure 20 is a sectional view on the lines 20—20, Figure 15, showing the carry-over means about to effect a carry-over.

In either addition or subtraction it is necessary that a carry-over be provided between adjacent accumulator units. To perform this function, the following provision is made:

A rod 330 in the casing 294, Figures 15 and 20, carries a series of segmental rockers 331, 332, 333, 334, 335, and 336 overlying the accumulator gear wheels 297, 298, 299, 300, 301 and 302 respectively and adapted to mesh with them when the accumulator assembly is moved upward in the casing 294 by the spring 311 as previously described. A segmental member 337 overlies the gear 303 and is secured by a screw 338 to the casing 294, since this gear is the lowest in the series of counters and therefore is never shifted by a carry over.

Trip plates 339, 340, 341, 342, 343 and 344, slidable in slots 345, and 345a in the sides of frame 295, overlies the cam 298a, 299a, 300a, 301a, 302a and 303a respectively. As the operation of all the carry-over devices is identical, it will be described herein by example, the carry-over or transfer taking place from the gear 300 to the gear 299. In Figure 20, the cam 300a of gear 300 is shown in section with the gear 299 behind it according to section lines 20—20, Figure 15. It will be understood that the intervening shell 306 and various other parts are omitted from Figures 20, 21 and 22 in order to clarify the showing of the carry-over mechanism.

Figures 21, 22:
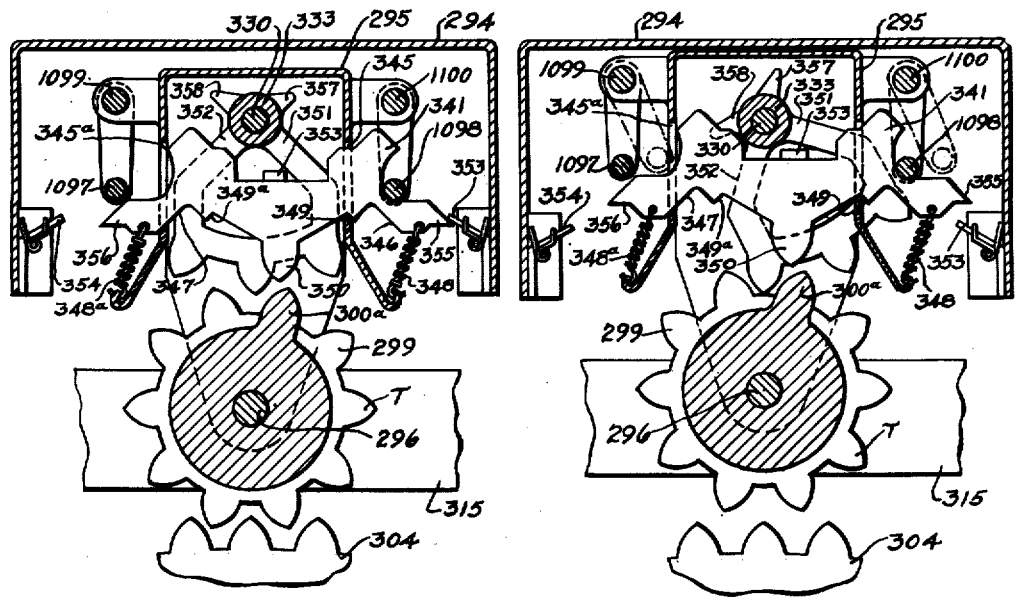
Figure 21 is a similar view showing the carry-over half completed.
Figure 22 is a similar view showing the carry-over operation completed.

Referring to Figures 20, 21 and 22, the trip plate 341 has two tapering recesses 346 and 347. Tension springs 348 and 348a urge the plate 341 downward so that the apices of the recesses normally rest on the bottom of the slots 345 and 345a respectively. Notches 349 and 349a are disposed adjacent the inward extremities of the recesses 346 and 347. A tooth 350 on the plate 341 normally projects downward into the rotary path of the cam 300a as shown in Figure 20. The segmental rocker 333 has sloping wings 351 and 352 adapted to be engaged by a finger 353, Figures 15 and 20, formed on the plate 341.

Assuming the cam 300a to be initially in the digit "9" position, as shown in full lines in Figure 20, a rotation of cam 300a by its gear 300 in addition direction, that is clockwise in the above figure, carries the cam into the zero position, as shown in dot and dash lines. In the movement described, the cam encounters the tooth 350, moving the plate 341 to the right and upwardly. As the cam 300a overrides the tooth 350 the notch 349 engages the bottom of the slot 345. The plate 341 is thereby held in the position shown in dotted and dashed lines, Figure 20, the finger 353 underlying the wing 351 of the rocker 333 but spaced a short distance below it.

As the spring 311, Figure 11, raises the accumulator assembly, as previously noted, the gear wheel 299 is drawn out of mesh with the segment 304 and starts into mesh with the segmental rocker 333. Figure 21 shows the position of the parts when the frame 295 has moved upward approximately half its total distance, in which position the teeth of the wheel 299 are nearly out of mesh with 304 and are entering mesh with the teeth of rocker 333, and in which the finger 353 engages the sloping wing 351 of 333. As the upward movement of the frame 295 and attached parts continues, the wheel 299 moves entirely out of mesh with segment 304 and into mesh with rocker 333, while at the same time the finger 353 swings the rocker 333 to the right. This movement of 333 carries with it the wheel 299 until the parts come to rest at the top of the up-ward movement in the position shown in Figure 22, the wheel 299 having been revolved the angular distance of one tooth T from Figure 21 to Figure 22.

From the foregoing it will be seen that the passage of the cam 300a from "9" to "0" position cocks the plate 341 to the right, and that the following upward movement of the accumulator assembly causes the plate to advance the next higher accumulator wheel in the series by one digit. In case of a double carry-over, that is, in case the passage of the cam 300a is caused by a carry-over to it from the lower unit 301, Figure 15, the action is as follows:

In this case the accumulator gear wheel 299 is already partly in mesh with rocker 333 before the cam 300a starts its clockwise motion, since this motion is now caused by carry-over from a lower unit. The plate 341 is in mid-position in the frame 295 as in Figure 20, but as the frame 295 itself has already been moved upward, the finger 353 is closely adjacent the sloping wings 351 and midway between them. As the cam 300a moves from "9" to "0" position it cocks the plate 341 to the right as already described, the finger 353 engaging the wing 351 to swing the parts into the same position shown in Figure 22 and thus revolving the wheel 299 one digit in the manner previously noted. By the means described, the device is adapted to carry-over throughout the entire series when necessary.

In order to return the trip plate 341 to normal position, upwardly rockable spring latches 354 and 354a are provided on the casing 294 opposite the ends of the trip plate 341. Tapered extensions 355 and 356 on the plate 341 are adapted to snap past the latches as the plate moves upward in cocked position as shown in Figure 21. As the accumulator assembly is again moved downward to mesh the gear wheel 299 with the segment 304, the tapered extension 355 encounters the latch 354 which restrains its downward motion, lifting the notch 349 clear of the bottom of slot 345 and allowing the springs 348 and 348a to snap the plate 341 into central position as shown in Figure 20.

The rocker 351 has on its top a pair of outwardly extending ears 357 and 358. As the frame 295 nears its lower position its upper part engages the ear 357, swinging the rocker 351 into central position as also shown in Figure 20.

The foregoing series of operation has been described in connection with an addition carry-over, but as the two sides of the apparatus are identical in structure, it is obvious that the device operates in the same manner when the cam 300a moves counterclockwise from "0" position to "9" position to effect a carry-over in subtraction. Due to the fact that all the transfer parts are returned to neutral position as the gears mesh with the segments 304, the device is always conditioned to effect a carry-over in either direction irrespective of whether an addition or subtraction has been made in the previous cycle.

Referring to Figures 15, 16 and 17, the hub 298b of the accumulator gear 298 has secured thereon an insulating sleeve 359, preferably of Bakelite, which carries a resilient brush 360 having two contact shoes 361 and 362. The shoe 361 slidably engages a conducting slip ring 363 secured in the shell 305 and provided with an exterior terminal 364. The second shoe 362 of brush 360 is adapted, when rotated, to successively engage a set of commutator segments 365, 365a, 365b, 365c, 365d, 365e, 365f, 365g and 365h, corresponding to counter positions of digits "1" to "9" and having exterior terminals 366, 366a, 366b, 366c, 366d, 366e, 366f, 366g and 366h, Figure 17. The zero position, as shown in Figure 17, also has a segment 365i provided with a terminal 366i. It will be seen that the brush 360 is adapted to establish an electrical connection between the slip ring 363 and any commutator segment with which the shoe 362 is in contact.

All the shells 534, 305, 306, 307, 308, 309, and 310 are provided with slip rings and commutators as described, except that the zero segment may be omitted from shell 310, but shell 310 also contains a second slip ring 367 provided with a terminal 368 and adapted to be connected by a forked brush 369 with a single commutator segment 370 extending around the interior of the shell 310 from the digit "5" to the digit "9" position inclusive, as shown in Figure 19. Segment 370 has a terminal 371.

To avoid confusion and complication on the wiring diagram, the various complete commutating units are represented in Figure 38 with their slip rings and segments arranged concentrically instead of side by side, and the complete units are denoted in Figures 15, 38 and 42 by the numerals 372, 373, 374, 375, 376, 377 and 378, the unit 378 being hereinafter referred to as the fractional cent commutator.

Referring to Figure 23, the error key 107, fraction key 108, total key 109, add key 110 and subtract key 111 are equipped with piston switches 379, 380, 381, 382 and 384 respectively, all secured on a conducting plate 383 separate from the plate 126 shown in Figure 7 and adapted to engage groups 379a, 385, 386, 387 and 388 of pins in the top of the permutation panel 153, Figure 34. The plate 383 is adapted to be connected electrically to one side of a source of current through a snap connector 389 on an insulating block 390 secured to the stationary frame of the machine.

The connector 389 and a similar connector 391, which latter supplies current to the numerical piston switches through the plate 126, Figure 7, also serve the purpose of latches to hold the frame 120 and key switch assembly firmly in place above the permutation panel 153.

The keys 107, 108, 109 and 111, Figure 23, are provided with a locking bar 392 operable by a solenoid 393 in the manner previously described in connection with Figure 7. A hook 394 on the right end of the bar 392 is adapted to rock the transverse member 151 counter-clockwise when the bar is moved to the left for a purpose hereinafter explained.

The various mechanical functions of the machine, as previously set forth, are brought about by rotation of the cam shaft 240. A motor 395, Figure 6, is adapted to drive a vertical shaft 396 through a worm 395a and worm gear 398. The vertical shaft 396 in turn is adapted to drive the cam shaft 240 through a clutch enclosed in a housing 397a, Figure 6, the clutch 397 being shown in detail in Figures 25 and 26.

A sleeve 399, Figure 25, is rotatably mounted on the shaft 240 adjacent a ball bearing 400 supported in the casing 116. Secured on the sleeve 399 is a worm gear 401 meshing in the usual manner with a worm (not shown) on the upper end of the vertical shaft 396. The left, or outer, end of the sleeve 399 has formed thereon a flange 402, hereinafter referred to as the driving member and provided with a series of circumferential notches 402a, 402b and 402c, Figure 26. A cylindrical member 403, hereinafter referred to as the driven member, encircles the sleeve 399 and driving member 402 which are normally rotatable therein. A flange 404 is secured to the driven member 403 and has a hub 405 secured on the cam-shaft 240 by means of a key 406 and set screw 407. Two cam rings 408 and 409 are secured on the outside of the hub 405 as shown in Figures 25, 27 and 28.

The driven member 403 has therein a recess 410 in which is rockably mounted a lever 411 which extends outwardly and terminates in an angular lip 412. A dog 413 extending laterally from the lever 411 so as to normally overhang the circumference of the driving member 402 is adapted to engage any one of the notches 402a, 402b or 402c when the lever 411 is rocked counterclockwise by a compression spring 414, Figure 26. A bracket 415 secured to a support 416 on the frame 116 has a pair of upwardly projecting lugs 417 and 417a carrying a horizontal pin 418. A trip latch 419, rotatably mounted on the pin 418, is urged upward by a spring 420 so as to normally engage the lip 412 of the clutch lever 411. A solenoid 421 is provided with a plunger 422 connected to the latch 419 and adapted to pull the latch 419 out of engagement with the lever 411 when the solenoid is energized.

Adjustable stop screws 423 and 424 are provided to limit the motion of the latch 419. An upwardly extending finger 419a on the latch 419 is adapted to be engaged by a cam 425 on the periphery of the driven member 403 to ensure positive relatching of the clutch.

The cam 408, as shown in Figure 27, engages an insulated shoe 426 on the inner arm 427 of a breaker 428 insulatedly secured to the bracket 415. When the cam 408 revolves it presses a contact point 429 on the arm 427 against a similar point 430 on the outer arm 431, thus establishing a connection between leads 432 and 433 attached to the arms. When the cam 408 completes its revolution to normal position, the shoe 426 overrides the sharp edge of the cam lobe, allowing the breaker to snap open, as shown in Figure 27.

A second breaker 854, of construction similar to breaker 428, is mounted on an arm 854a, secured to the bracket 415, Figures 27 and 25. Breaker 854 is arranged to be normally held closed by cam 408, and is allowed to snap open as approximately seven-eighths of the latter's revolution is passed, being then reclosed as the revolution is completed.

The cam 409, as shown in Figure 28, is adapted to operate a third breaker 434. The operation is the same as described except that in normal position the cam 409 holds the third breaker 434 closed, the break occurring at substantially the half-way point in the cam's revolution. Breaker 434 is provided with leads 435 and 436. A fourth similar breaker 437, superimposed on the second breaker 434, has on its inner arm 438 an insulating shoe 439 bearing against the rear of the inner arm 440 of breaker 434. The fourth breaker 437 is thus operable by the cam 409 simultaneously with the third breaker 434. Breaker 437 has leads 442 and 441, the latter of which is connected to the solenoid 421, as shown in Figure 25, the second lead of the solenoid being denoted by the numeral 443.

The operation of the clutch is as follows:

Assuming the motor 395 to have been started by means hereinafter set forth, the sleeve 399 is driven thereby through the vertical shaft 396 and worm gearing previously described, the driving member 402 idling inside the driven member 403 which latter is held stationary by the latch 419 engaging the lever 411, as shown in Figure 26. When the solenoid 421 is energized, the plunger 422 is drawn downward, releasing the lip 412 of lever 411. The spring 414 forces the lever 411 counter clockwise, causing the dog 413 to snap into the first of notches 402a, 402b or 402c, which registers with it, thereby clutching the driven member 403 to the driving member 402. The member 403 is thereby rotated, carrying with it the attached flange 404, hub 405, and cam shaft 240. As the cam 409 on hub 405 revolves past the half-revolution, the breaker 434 and 437 open, as previously described. The breaker 437 being in series with the solenoid 421 through the lead 441, the opening of 437 breaks the circuit through the solenoid, allowing the latch 419 to be snapped upward by the spring 420.

As the driven member 403, cam shaft 240, and attached parts approach the end of one revolution, the latch 419 intercepts the lever 411, swinging the latter clockwise in the driven member to withdraw the dog 413 from the notch in the driving member and bring the driven member 403 again to a stop in the position shown in Figure 26. A spring-pressed wedging pawl 444 is adapted to snap into place behind a ratchet cam 445 on the driven member, thus preventing rebound of the latter and holding the cam shaft accurately in stop position.

The purpose of the finger 419a is to ensure return of the latch to stopping position irrespective of the strength of spring 420. In case the latch 419 has not been returned to upper position by the spring before the cam 425 encounters the finger 419a, the cam swings the finger outward, thus positively returning the latch 419 to latching position, as shown in Figure 26.

This provision allows the spring 420 to be relatively light, reducing the necessary size and current consumption of the solenoid 421 while at the same time making impossible any accidental failure of the clutch to disengage at the end of one revolution. In this manner accidental "repeating" or double operation of the machine by the camshaft is prevented.

Referring to the wiring diagram, Figure 39, the permutation panel 153 comprises all the connections enclosed in the dotted and dashed rectangle. While in order to avoid undue multiplication of lines in the diagram certain leads are shown joined within the interior of the panel rectangle, it will be understood that in practice all connections are made between internal terminals in the panel itself as illustrated in Figure 37. For instance, from typical jacks 169a and 169b, constituting the incoming terminals, Figure 37, connections are made by individual leads 171a and 171b to the posts 172b and 172c which constitute the cut-going terminals. Obviously only one lead may be plugged into each jack, but a number of leads may be required connecting different jacks to one post, especially in panels wired for billing computations as illustrated in Figures 40 and 41. For this reason the posts 172 are made relatively long, as shown in Figure 7, in order to accommodate as many lead eyes or clips as may be required.

Figure 35:
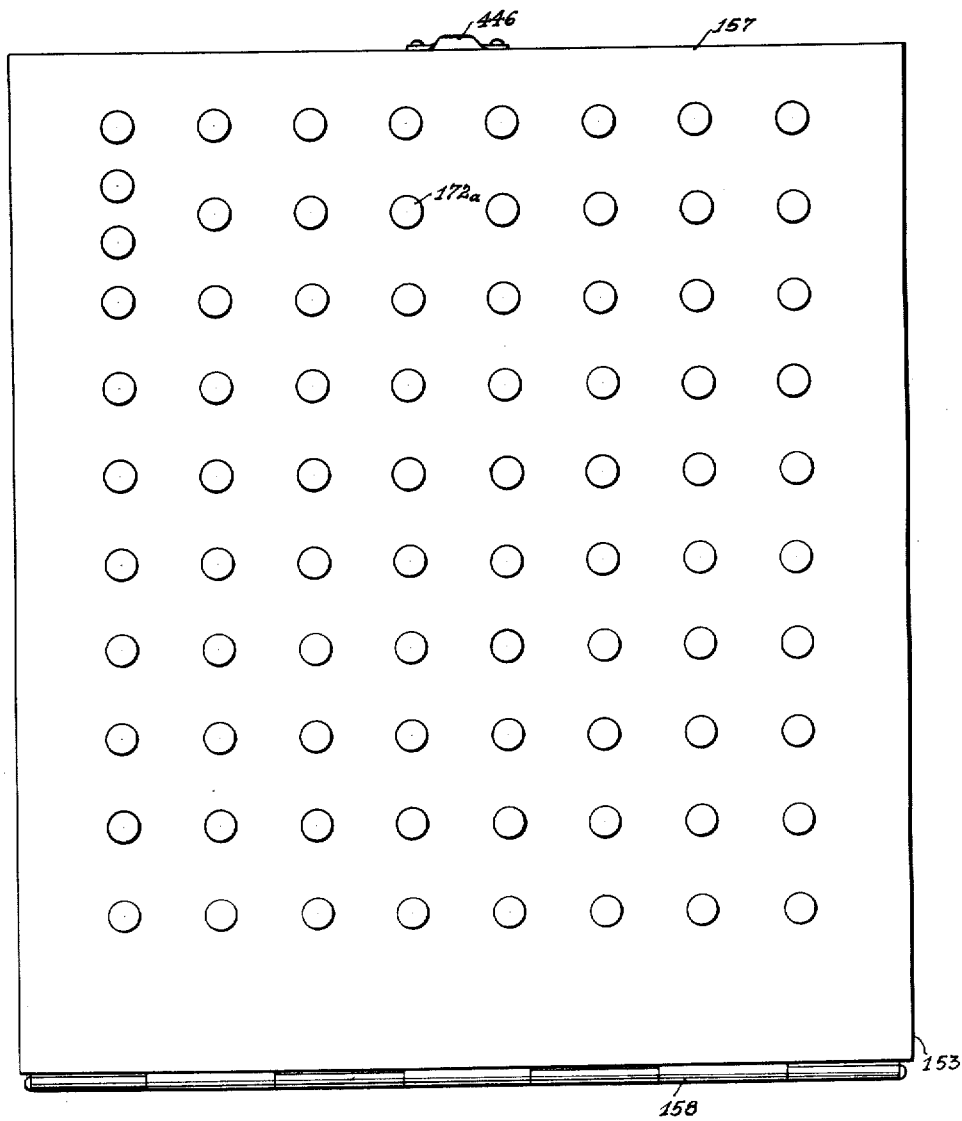
Figure 35 is a bottom view of the same.

In order to conveniently wire a permutation panel 153, a spring latch 446, Figures 34, 35 and 36, is released and the panel laid open, the hinge 158 allowing the upper and lower portions to be spread apart after the manner of an open book, to expose all the internal connecting means.

All connections are then made between jacks and posts, as illustrated in Figure 37, all the leads overlying the hinge 158. A binding strip 447, preferably a channel of insulating material, is then secured over the bunched leads, as shown in Figure 7. The panel is then closed, the latch 446 snapping into engagement to hold the parts firmly together.

A closure casing or cover 448, Figures 5, 6 and 7, having been removed from the machine, the keyboard with its attached switches 127, is swung upward by means of a finger grip 449, the entire key and piston-switch assembly swinging on the rod 121. The panel 153 is then dropped into place on the brackets 154 and 155, Figure 7, and the keyboard assembly closed above it, the snap or latch connectors 389 and 391 holding the keyboard assembly firmly in position while downward projections 450 and 451 thereon press against the top plate 160 of the permutation panel. All parts are thereby located in operative relation as shown in Figures 5 and 7, after which the closure casing 448 is replaced on the main casing or base 116 and the machine is ready for operation as hereinafter described.

In connection with the following description, it will be noted that the wiring in Figures 39, 40 and 41 is identical except those connections which are within the permutation panels. This illustrates the fact that in order to change the machine from one type of function to another it is only necessary to replace the panel wired for the first type of function with a panel wired for the second type. No wiring connections are made between the panel and the remainder of the machine. Panels may therefore be wired for any desired function by experts at the factory or service station, from which they may be shipped to users of the machines. The user has only to place the panel in the machine as previously described, in order to condition it to perform the desired function, the necessity on his part of any wiring skill or ability to set up plugboard connections being entirely eliminated.

Referring again to the circuit diagram, Figure 39, main lines 452 and 453 are normally connected to a source of current. From the line 453 a branch lead 454 is connected to the motor 395. The second lead 455 of the motor is connected to a normally open breaker 456 controllable by a relay magnet 457, from which breaker a wire 458 is connected to the main line 452, the wire 456 also being connected to one terminal of the magnet 457.

The line 453 is normally connected through the breaker 434, leads 436 and 560 and the latch connector 391 to the conducting plate 126, which carries and supplies current to the key switches 127, shown in Figure 7, and which is diagrammatically represented as lead line and its branches leading to the various key switches in order to clarify the diagram, the same diagrammatic procedure being followed throughout the figures wherever the attempt to represent conducting parts pictorially would greatly increase the complication and necessary size of the diagram.

From each key switch, for example, the switch 127 of the digit seven key 102a in the tens column, the contact pins 161, 162, 163, 164, 165 and 166 lead into the permutation panel 153 as illustrated by the lines 461 and 462 representing continuations of the pins 161 and 166 respectively. From the pin 166 the internal lead 171 in the panel completes a connection through a wire 463 and a branch lead 464 to the number "7" set up solenoid 189 in the tens row, Figure 38. From the solenoid 189 as well as all the other solenoids in the tens row, a common line 465 leads to the magnet 466 of the quick-acting breaker 226, previously shown in Figure 8. The other terminal of the magnet 466 is connected through a lead 467 to the main supply line 452, Figure 39.

The pin 161 and its continuation 461 are connected through an internal lead 171c of the panel 153 and a lead 468 to the locking bar solenoid 144, Figures 5 and 7. From the solenoid 144 and the similar locking solenoids 144a, 144b, 144c and 144d of the various numerical key rows a common lead line 469 leads through a magnetic breaker 470 to the main supply line 452, the breaker 470 being controllable by an electromagnet 471.

From the supply line 452 a lead 472 runs to the controlling magnet 473 of a normally open relay 474, Figure 38, hereinafter referred to as the cut-in relay. From the magnet 473 a conductor 475 leads to the panel 153 through which a connection is made in the manner previously described, via lead 492 to a contact pin 476 of the total key 109, a pin 477 of the add key 110, and a pin 478 of the subtract key 111, Figure 39.

Referring to Figure 38, it will be seen that one contact point 479 of the breaker 226 and the contact member 222, shown in detail in Figure 8, are connected to a common conductor 480. Similarly, the other point 481 of breaker 226 and the contact member 221 are connected to a second common lead 482. The breaker 226, as previously noted, is normally closed, while the contact members 221 and 222 are normally out of engagement. If a current is directed through any setup solenoid such as 189 in the tens row, the breaker magnet 466 being in series with all solenoids in that row is also energized to quickly break the connection between conductors 480 and 482.

As soon as the setup solenoid 189 acts to set up its detent, the rocker 219 is moved as described in connection with Figure 8 to bring the contact member 221 and 222 into engagement, thus re-establishing the contact between leads 480 and 482. The two sets of contacts just described together with their actuating means thus constitute a break-and-make combination which breaks the connection between leads 480 and 482 as any setup solenoid in the tens row is energized to start a setup and restores the connection as the setup is completed.

By reference to the diagram, Figure 38, it may be seen that a break-and-make combination as just described is provided for each row of setup solenoids, and that all the contact combinations are connected in series from conductor 460 at the left of the diagram by means of leads 483, 484, 480, 482, 485, 486, 487, and 488 to one contact of the normally open relay 474, the other contact of relay 474 being connected to a conductor 489 leading to the motor relay magnet 457, Figure 39.

From the conductor 489 the lead 443 is connected to the clutch trip solenoid 421, shown in Figures 25 and 26, and from solenoid 421 a connection is made through the lead 441, breaker 437 and lead 442 to the main line 452. The breaker 428, previously shown in Figure 27, is connected between the conductor 489 and main line 453 by means of leads 433 and 432.

The lead 432 is normally connected through breaker 854 with a conductor 490 which leads through the snap connector 389 to the conducting plate 383 which supplies current to the error, fraction, total, add and subtract key switches 379, 380, 381, 382 and 384.

Two contact pins of the error key switch 379 are respectively connected through the panel 153 by means of internal leads 171d and 491 with the locking solenoid 393 and the magnet 471 which latter magnet is also connected to the main line 452.

The fraction key switch 380 has no connections in the panel 153, as this switch has no function in ordinary addition, subtraction and total taking for which the machine is arranged by the panel illustrated in Figure 39.

The total key switch 381 has five connections through the panel 153 as follows:

1. To the cut-in relay magnet 473, Figure 38, via panel lead 492 and the lead 475 as previously noted;

2. To the locking bar solenoid 393 through lead 171e, shown as joining 171d to avoid multiplicity of lines;

3. To the subtract cam solenoid 326 through panel lead 493 and external lead 494, the solenoid 326 being connected on the other side to main line 452;

4. Through a panel lead 495, an external lead 496, a throwover switch 497 hereinafter described, and a conductor 498 to the total symbol setup solenoid 499, Figure 38; and 5. Through a panel lead 500, Figure 39, a wire 501, the breaker 524, Figure 11, to conductor 524c. From conductor 524, normally open switches 502a, 503a, 504a, 505a, 506a, 507a and 508a are adapted when closed to form connections through leads 502, 503, 504, 505, 506, 507 and 508 to the slip rings of accumulator commutators 372, 373, 374, 375, 376, 377 and 378 respectively.

It will be understood that the above indicated switches constitute the parallel contactors of a multi-contact relay operable by a single solenoid or electro-magnet 524d secured on the side of the accumulator casing 294, Figure 11. One side of magnet 524d is connected to conductor 524c, while its other side is connected through a lead 524e to a conductor 571 which in turn is connected to the main line 452. The magnet 524d acts to close its various switches noted above whenever the conductor 524c is energized, but normally allows the switches to stand open. The purpose of this arrangement is to prevent possible flow-back of current to the conductor 524c through any commutator during the set-up of selector solenoids by depression of the digit keys.

The add key switch 382 has four connections through the panel 153 as follows:
1. Via panel lead 509 to the conductor 475 leading to the cut-in relay magnet 473, Figure 38;
2. To the locking bar solenoid 393;
3. Via a panel lead 510 and external lead 511 to the add symbol setup solenoid 512, Figure 38; and
4. Via a panel lead 513 and external lead 514 to the add cam solenoid 325, the other side of solenoid 325 being connected to the main line 452.

The subtract key switch 384 has the following connections through the panel 153:
1. To the conductor 475 leading to the cut-in relay magnet 473 in the same manner as described for the total and add key switches;
2. To the locking bar solenoid 393;
3. Through a panel lead 515 and external lead 516 to the subtract symbol setup solenoid 517, Figure 38; and
4. Via a panel lead shown for purposes of simplification as the lead 493 and a branch thereof to the external lead 494, thence to the subtract cam solenoid 326.

The operation of the device, as arranged for addition, subtraction and total taking, is as follows, the operation of key 102a being taken as typical of that of all numerical keys:

As the operator depresses key to enter digit seven in the tens column, the piston 128 (Figure 7) of the key-switch 127 encounters the elongated pin 161. The switch 127 being connected through the plate 126 and other conductors previously described with one main supply line 453, current flows from the switch through the pin 161, lead 461, panel 171c, locking bar solenoid 144, conductor 469 and breaker 470 to the other main supply line 452. The solenoid 144 is thereby energized, throwing the switch into firm contact with its remaining pins and locking the other key switches in the tens row as previously described.

Current flows from the pin 166 through lead 462, the panel lead 171 and leads 463 and 464 to the digit seven solenoid 189, Figure 38, thence through conductor 465, breaker magnet 466 and return line 467 to the main supply line 452; solenoid 189 and magnet 466 are thereby energized, the magnet acting as previously described to break the connection between leads 480 and 482 while the solenoid raises or sets up its selector detent and restores the above connection by moving the bar 219 as the setup is completed.

As keys in other rows are depressed to complete the digit entry, the same sequence of events takes place in the manner described, the depressed keys being held down by their locking solenoids to maintain the circuits through the setup solenoids which thereby maintain their respective detents in setup position, as illustrated in Figure 8.

If is is desired to add the digit entry, the add key 110 is depressed, causing its locking solenoid 393 to act as previously described, closing circuits through the add cam solenoid 325, the add symbol setup solenoid 512, Figure 38, and the cut-in breaker magnet 473. The symbol solenoid operates in the manner previously described to set up its selector detent and re-establish a connection between conductors 483 and 460. Meanwhile the cut-in relay 474 is closed, completing a circuit from the main line 453 through the breaker 434, the line 460, the various break-and-make combinations in series, as previously described, the relay 474 and line 489 to the motor relay magnet 457 thence via lead 458 to the main line 452.

The motor relay 456 is thereby closed, directing current from line 453 through the motor 395, lead 455, relay 456 and lead 458 to the line 452 and starting the motor. Current from the conductor 489 also passes through the clutch trip solenoid 421 and breaker 437 via 442 to the line 452, causing the clutch to engage and revolve the camshaft 240 through one revolution, as previously described, to set up the type bars and print the digit entry.

The add cam solenoid 325 being energized, as previously noted, causes its cam and cooperative parts to throw the accumulator wheels into mesh with the segments 304 during the first half revolution as illustrated in Figure 11, revolving the wheels and with them their commutator brushes, previously described and illustrated in Figures 15, 16 and 17, an angular fraction of a revolution corresponding to the value of the respective digits set up and printed. For example, starting from zero position, Figure 38, the brush 418 of commutator 374 is revolved through seven-tenths of a revolution, coming to rest in contact with the number "7" segment of the commutator as the machine sets up and prints the digit "7" in the tens column. Similarly, the other commutator brushes form connections between their slip rings and the commutator segments corresponding to the numbers set up by their selector mechanisms. As the cam shaft approaches the half-revolution point, the add cam allows the accumulators to be raised out of mesh, leaving the entered amount stored therein.

As the camshaft reaches the half-revolution point, the cam 409 allows the breakers 434 and 437 to spring open. The opening of 437 deenergizes the clutch trip solenoid 421 to allow the latch 419, Figure 26, to return to stop position and disengage the clutch at the completion of the revolution. The opening of breaker 434 breaks the circuit from the line 453 to the plate 126, deenergizing the locking bar solenoids and the selector solenoids. The numerical keys thereby are allowed to return to normal position.

Previous to the opening of the breaker 434, the cam 408 closes the breaker 428, thus providing a direct connection from the line 453 to the conductor 489 to keep the motor in operation.

At approximately the seven-eighths point in the revolution the cam 408 allows the breaker 854 to open, cutting off the current supply to the add key switch through plate 383; the locking solenoid 393 being thereby deenergized, the add key is released and rises to normal position, breaking all pin connections from its switch.

The motor continues to run until the revolution of the camshaft is completed, when the cam 408 allows the breaker 428 to open. The conductor 489 is thereby deenergized, releasing the motor breaker 456. The motor stops, returning all the parts to normal condition except that the digit entry has been stored in the commutating accumulators as previously described.

As additionals entries are made in the machine and printed thereby, the above sequence of operations is repeated, except that in each case the accumulator wheels start from their position determined by the previous operation so that the final positions of the brushes with respect to the commutator segments corresponds to the total accumulated.

When it is desired to subtract an entry, the procedure and operation are the same as above, except that the depression of the subtract key 111 throws the subtract symbol selector solenoid 517 and the subtract cam solenoid 326 into action, printing the subtract symbol and bringing the counter wheels into mesh during the second half revolution of the camshaft 240. As the segment 304, Figure 11, returns to normal position, the gear wheels are revolved in the reverse direction, resulting in a direct subtraction of the entry from the quantity previously stored in the accumulators.

It will be noted in Figure 38, and the enlarged detail wiring diagram, Figure 42, that the digit "7" solenoid 189 is connected through the lead 464, a conductor 519 forming a continuation of lead 463, a short lead 520, a double-throw or throw-over switch 521, and a lead 522 to the number "7" segment 523 of the commutator 374. Similarly all the other solenoids in the tens row are connected to corresponding segments of the commutator 374 while the solenoids of the other denominational rows are connected in the same manner to corresponding segments of their respective commutators, with the exception that in the case of the thousandths or fractional cent commutator 378 no throw-over switches are interposed, as shown in Figure 38. The function of the throw-over switches is hereinafter explained in connection with taking negative totals.

Assuming a positive total to have been accumulated in the commutators, as previously described, the total may be printed as follows:

The total key 109 is depressed, energizing the locking bar solenoid 393, as noted above, to positively close the connection of the total key switch 381 with all its contact pins. Current flows through the panel lead 500, the wire 501 and breaker 524 to the conductor 524c through the relay magnet 524d, thence via conductors 524e and 571 to the line 452, Fig. 39. The relay magnet 524d is energized closing switches 502a, 503a, 504a, 505a, 506a, 507a and 508a, allowing current to flow from conductor 524c to the various commutator slip rings, thence through the brushes and segments in contact therewith and the leads and throw-over switches, described above, to the various setup solenoids corresponding to the stored total.

For example, if the brush 518 in total position provides a connection between slip ring 525 and segment 523 of the commutator 374, as shown in Figure 42, current flows from the switch 504a and lead 504 through slip ring 525, brush 518 segment 523, lead 522, switch 521, short lead 520, and conductors 519 and 464 to the solenoid 189, which is energized in the same manner as though its key 102a has been depressed. In other words, all setup solenoids corresponding to the accumulated total are set up as though their respecetive keys had been depressed simultaneously.

Meanwhile, current also flows from the total key-switch 381 via connections previously described, to the total symbol setup solenoid 499, Figure 38, to the cut-in relay magnet 473, Figure 38, and the subtract cam solenoid 326, Figure 39, The motor is started upon completion of a circuit to conductor 489, as previously described, and the machine goes through a cycle, the setup total being printed. During the second half of the cycle the action of subtract cam 328, Figure 11, depresses the counter gears into mesh, as previously described, causing the total just printed to be subtracted in the accumulators. By this means the accumulators are cleared or returned to zero position. The downward motion of the accumulator assembly in moving into mesh separates the contacts 524a 524b of the breaker 524, thus cutting off the current through the commutators before they are revolved in clearing. From the above description it will be noted that the positive total is printed and the counters cleared in a single revolution of the cam shaft 240.

The cooperative action of the relay 226 and contacts 221 and 222 in breaking a connection in the line to the motor relay 457 at the instant any selector solenoid in the tens row is energized and restoring it as the solenoid completes the setup of its detent, has been previously described in connection with addition, it also having been pointed out that each row of selector solenoids is provided with a similar break-and-make combination. The principal purpose of these combinations is carried out in the total taking operation just described, in which a number of selector solenoids are energized at the same time.

By the provision of the above combinations, the motor relay connection is broken at each row of selector solenoids containing a solenoid energized through the commutators, the break occurring substantially at the instant the current is applied, and the connection at each row is not restored until the setup in that row is completed. As the various make-and-break combinations are disposed in series in the motor relay line, it is obvious that no current can pass through that line until the slowest selector solenoid has acted. It is therefore impossible for the motor to start until all detents of any multiple setup have been raised to selecting position, thus assuring proper operation at all times.

The foregoing description of total-taking has dealt with the operation when the total stored in the accumulator is positive. In case the total of a series of entries is negative, if the exact procedure described above were carried through, the total printed would not comprise the various digits of the true negative total desired. In order to print the negative total itself, the following provision is made:

Figure 31, taken on the line 31—31, Figure 15, shows in detail the highest denominational accumulator wheel 297 together with certain occoperative parts, parts not related to the function about to be described being omitted for purposes of clarity.

A trip plate 526, similar in general to the plate 341 shown in Figures 20, 21 and 22, is similarly retained in slots 527 and 528 in the movable frame 295, the downwardly projecting tooth 529 of plate 526 normally lying in the rotary path of the teeth of gear 297 which, as previously stated, is provided with a wide face. Lateral extensions 530 and 531 of plate 526 protrude through slots 532 and 533 in the stationary casing 294. A downward extension 535 of the casing 294 has insulatedly secured thereto a pair of cooperative resilient members 536 and 537 carrying contact points 538 and 539 normally separated from each other, the inner member 536 also carrying an insulating shoe 540 in line with the extension 530 of plate 526. A similar pair of resilient members 541 and 542, having contact points 543 and 544, are insulatedly mounted on a second downward extension 545 of the casing 294. An insulating shoe 546 is secured to member 542 in line with extension 531 of plate 526.

The trip plate 526 contains two vertical slots 1095 and 1096 through which are disposed bails 1097 and 1098 swung on rods 1099 and 1100 bracketed to the movable frame 295. The bails 1097 and 1098 extend through triangular openings 1101 and 1102 in the lowest order carry-over plate 344, as illustrated in Figure 31.

The outer contact members 542 and 537 are connected by leads 547 and 548 to solenoids 549 and 550 of a throw-over relay 551. The solenoids 549 and 550 have a common plunger 552 reciprocable therein. A cross pin 553 in the middle of the plunger 552 engages a slitted arm 554 secured to a rocker shaft 555. A plurality of throw-over switches of which switch 521, shown diagrammatically in Figures 38 and 42, is typical, are arranged along the shaft 555 as shown in Figure 32. Referring to Figure 33, the typical switch 521 has a resilient contact arm 556 secured to the shaft 555 by means of an insulating strip 557. The arm 556 is adapted to alternately engage switch points 558 and 559 secured to stationary insulating walls 560 and 561. The entire assembly of the relay 551 and throw-over switches is secured in the base 116 of the machine by means of brackets 562, Figure 5.

An insulating toggle lever 563, Figures 31 and 32, is rotatably mounted on the shaft 555, extending downwardly, and is linked to the lever 554 by a tension spring 564. The toggle lever 563 carries contact points 565 and 566 adapted to respectively engage stationary contacts 567 and 568 connected respectively by leads 569 and 570 to the solenoids 550 and 549. A flexible lead 571 connects the points 565 and 566 to a source of current as hereinafter set forth.

A lead 572 and its branch 573 connect the inner contact members 536 and 541 to the source of current on the side of opposite polarity to that of lead 571.

The operation of the throw-over mechanism is as follows:

As Figure 31 shows the accumulator wheel 297 viewed from the left, with reference to Figure 15, that is, in the same direction as the view in Figure 5, the wheel 297 is revolved clockwise during subtraction and counter-clockwise during addition. If at any time the total accumulated becomes less than "0" the wheel 297 is turned clockwise from the "0" to the "9" position by the carry-over from the lower orders. As this occurs, a tooth T₁ encounters the tooth 529 of the plate 526, moving and cocking the plate 526 to the right in the same manner as described with reference to the carry-over plate 341 in Figures 20, 21 and 22.

The extension 530 of plate 526 engages the insulating shoe 540, moving the contact point 538 into engagement with point 539. As the toggle arm contact point 565 is normally in engagement with stationary point 567 as shown, a circuit is established between leads 572 and 571 through the solenoid 550 which is thereby energized. The plunger 552 is drawn to the left, swinging the arm 554 counter-clockwise to rock the shaft 555. As the toggle spring 564 crosses dead center it rocks the toggle arm 563 clockwise, disengaging point 565 from stationary contact 567 and bringing point 566 into engagement with the stationary contact 568. The disengagement of contacts 565 and 567 breaks the circuit between supply leads 572 and 571.

The rocking of shaft 555 throws switch arm 556 from its contact 558 to the opposite contact 559, as shown in dotted and dashed lines, Figure 33. Similarly, all the other throw-over switches are shifted to their opposite contact points.

When the frame 295 is raised to lift the gear wheels out of mesh, the tapered extension 356a overrides the small swinging latch 354a and on the next downward movement the latch engages the bottom of 356a to trip the plate 526 back to normal position in the manner previously described.

If, before a total is printed, the gear 297 is revolved counter-clockwise from the "9" to the "0" position, in other words, if the stored quantity again becomes positive or zero, the plate 526 is cocked to the left, the extension 531 closing the contacts 543 and 544, energizing the solenoid 549 to swing the throw-over switches to the right into their normal position shown in Figures 33, 38 and 42.

As the trip plate 526 is moved to the right or left as described it swings the bails 1097 and 1098 in its direction of travel. Referring to Figure 31, it will be noted that the bails 1097 and 1098 normally rest in the apices of the triangular openings 1101 and 1102 in the carry-over plate 344, so that the plate 344 may move without interference from the bails in the course of ordinary carry-overs when the fractional cent accumulator is in use. When, however, the bails are swung by the trip plate 526 they carry with them the carry-over plate 344 by engaging the inclined sides of the openings.

From the foregoing it is evident that whenever the trip plate 526, Figure 31, is cocked in either direction by a change from positive to negative total, or vice-versa, it sets up and causes a carry-over in the corresponding direction in the hundredths order accumulator. The purpose of this arrangement, as will shortly appear, is to eliminate the possibility of so-called "fugitive one."

Referring to the diagram, Figures 38 and 39, the lead 571 is connected to the main supply line 452 while the lead 572 is similarly connected to main line 453, thus supplying current to the throw-over mechanism.

From the above description it is evident that whenever the quantity stored in the accumulators since their last clearing is positive, the throw-over switches are held to the right in normal position, as shown, but whenever the stored quantity is less than "0" the switches are held to the left.

Referring to the enlarged diagram, Figure 42, it will be seen that the left hand contact 559 has attached thereto a lead 574 connecting through leads 705 and 706 to the digit two solenoid 707. If, therefore, the switch 521 be thrown to the left, the digit seven segment 523 is connected, not to the solenoid 189 adapted to set up the digit "7" solenoid, but to the solenoid 707 adapted to set up digit "2," one less than the complement of "7." Similarly, the left-hand poles of all the throw-over switches are connected to set up solenoids corresponding to digits which are one less than the complements of those represented by the solenoids connected to their right hand poles. Since any digit less by one than the normal or tens complements of a second digit is equal to the difference between nine and the second digit, such first digits may be termed the "nines complements" of the others, and are so referred to hereinafter.

As a result of the above arrangement, if a negative total is in the accumulators when the total key 109 is depressed, the device sets up and prints the nines complements of the commutator settings.

Due to the action of the balls 1096 and 1097, the hundredths order counter has been advanced in the negative direction by the operation of the throw-over mechanism as described above, with the result that the amount printed is the true negative total, as illustrated by the following examples of mixed addition and subtraction resulting in a negative total:

| | |
|---|---|
| Enter | + 36.22 |
| Enter | − 144.13 |
| True difference = | − 107.91 |
| Enter | + 36.22 |
| Subtract directly | 144.13 |
| | 9892.09 |
| | .01 |
| Commutator connections | 9892.98 |
| Throw-over | −0107.91=Difference |
| Enter | − 620.44 |
| | −0728.35 |
| Enter | + 13.60 |
| Print true negative total | − 714.75 |

If while a negative amount is stored in the accumulators and previous to taking a total, sufficient positive entries are made to carry the total again into the positive zone, the apparatus reverses the above operations as follows:

| | |
|---|---|
| Accumulation | − 714.75 |
| Enter | + 873.21 |
| True difference = | + 158.46 |
| Accumulation | − 714.75 |
| Add (=negative subtraction) | + 873.21 |
| | 9841.54 |
| | .01 |
| Commutator connections | 9841.53 |
| Throw-over | 0158.46 |
| Print true total | + 158.46 |

The apparatus as described will be seen in effect to operate directly as an adding and subtracting machine in identically the same manner on either side of zero, the normal adding and subtracting functions being merely reversed in the field of negative accumulations.

In crossing from one field to the other in either direction, the combination of the shift in commutator connections and the advance of the hundredths counter in the corresponding direction has the effect of maintaining the carry-over functions of all the counters in proper relation to the commutator connections for direct addition or subtraction in either direction from the zero total point.

In case a negative amount is stored and an equal positive amount is entered, the accumulators return to zero without throwover to the positive position. This is immaterial, however, for if the next entry is positive the throwover occurs as the entry is made.

When a negative total is taken, as just described, the throw-over switch 497, Figure 38, has broken the circuit between the conductor 496 and the total symbol solenoid 499 and instead directs current from 496 through a lead 578 to a negative total symbol selector solenoid 579 which is adapted to cause a symbol such as "CRE," standing for "credit balance," to be printed by the type bar 247a, Figure 12.

In order to clear the accumulators after printing a negative total, the following provision is made, referring first to Figures 30 and 30a. The cam shaft 240 carries a spur gear 580 meshing with a second gear 581 rotatably mounted on a pin 582 secured to the machine body or frame 116, as illustrated in Figures 24 and 30a. The gear 581 has a pitch diameter double that of gear 580, and therefore is adapted to make one revolution during two revolutions of the camshaft 240. A cam 583 is also rotatable on the pin 582 adjacent to the gear 581. A spool 584, rotatable and slidable on an enlarged portion 585 of the pin 582, has secured therein two diametrically spaced pins 586 and 587 which are slidable through holes in the gear 581 and adapted to engage holes 588 and 589 in the cam 583. A spring-pressed latch ball 590, Figure 30a, normally engages the left end of hole 589, thereby retaining the cam in its normal position shown in Figures 30a and 30.

A shifter yoke 591, Figure 30a, engaging the groove 592 of spool 584, is pivotally mounted at 593 on a bracket 594 secured to the casing frame 116. The yoke 591 has a downward extension 595 containing a slot 596 engaging a pin 597 on a plunger 598 of a solenoid 599. A tension spring 600 urges the yoke 591 and its extension 595 clockwise, thus normally holding the pins 586 and 587 clear of the cam 583 as shown in Figure 30a. If the solenoid 599 is energized, the plunger 598 rocks the yoke 591 counter-clockwise, sliding the spool to the left thrusting the pins 586 and 587 into the holes 588 and 589. By this means the gear 581 and 583 are clutched together.

Three breakers 601, 602 and 603 are disposed around the cam 583 as shown in Figure 30. The breaker 601 is normally held open by the cam lobe 604. The lobe 604 comprises approximately ninety degrees of arc, and is therefore adapted to allow the breaker 601 to close just before the cam has revolved one quarter of a revolution, that is, just prior to the completion of one half revolution of the cam shaft 240. The breaker 602 is adapted to be closed by the lobe 604 during the second quarter of the revolution of cam 583, or the second half of the revolution of cam shaft 240. The breaker 603 is adapted to be closed by lobe 604 just before the half-revolution point of the cam 583, in other words, just prior to the completion of one full revolution of the cam shaft 240.

Referring to the wiring diagram, Figure 38, the numeral 605 indicates a conducting arm normally spaced from contact points 606 and 607 and connected by a lead 608 with the conductor 494, Figure 39, leading to the subtract cam solenoid 326. A relay magnet 609, Figure 38, adapted to draw the arm 605 into contact with the points 606 and 607, is connected to the leads 578 and 571, previously described. A holding magnet 610, adapted to maintain the arm 605 in contact with points 606 and 607, is connected by means of leads 611 and 612 respectively to the lead 571 and one side of the breaker 601.

Th relay contact point 607 is connected with breaker 603 by a conductor 613 which has branches leading to the breakers 601 and 602. From breaker 602 a wire 614 is connected to the lead 547 of the throw-over relay 551. From breaker 603 a lead 615 forms a connection to the conductor 524c supplying current to the slip rings of the commutators, as previously described. The cam clutch solenoid 599 is terminally connected to the conductors 613 and 571.

The operation of clearing the accumulators after taking a negative total is as follows:

The throw-over switches being shifted to the left, as the total key 109 is depressed to print the negative total, current flows through the conductor 578 to the negative total symbol solenoid 579 as previously noted. Current from conductor 578 also flows through the relay magnet 609 to the conductor 571, thence to the main supply line 452, Figure 39. The magnet 609 is energized and draws the arm 605 into contact with the points 606 and 607. The point 606 being connected by means of a lead 616, to the conductor 572, a connection is completed from one main line 453, Figure 39, through conductor 572, lead 616, Figure 38, point 606, arm 605, and point 607 to the lead 613. Current flows from 613 through the cam clutch solenoid 599 to the conductor 571, thence to the other main supply line 452, Figure 39. The solenoid 599 is thereby energized to clutch the cam 583 to its gear 581, Figure 30a, by which means the cam is driven clockwise at half camshaft speed as the main clutch 397 engages to initiate the printing cycle.

When the cam 583 has revolved through approximately ninety degrees, the breaker 601 closes, as previously described, establishing a circuit from the energized conductor 613, through lead 612 and the holding magnet 610 to the conductor 571 which, as previously described, is connected to the main line 452 of polarity opposite to that of lead 613. The magnet 610 is thereby energized and remains so until the breaker 601 is opened by the cam 583 at the completion of a revolution thereof. By this means the conductor 613 is kept charged with the polarity of conductor 572 and main line 453 until the cam 583 completes its revolution.

During the second quarter turn of the cam 583, that is, during the second half turn of the main camshaft, and while the circuits through the accumulators have been broken at the breaker 524, due to the lowering of the accumulator assembly by the subtract cam, the breaker 602 is closed. Current flows therethrough from the charged conductor 613, through the lead 614 and 547 to the solenoid 549 of the throw-over relay 551, thence through the relay toggle switch previously described and to the conductor 571. The solenoid 549 shifts all throw-over switches to the right into normal position. As the main camshaft approaches the end of its revolution, as in completing a normal cycle, the cam 583 approaches its half revolution and closes the breaker 603.

The closing of breaker 603 permits current to flow from charged conductor 613 through the lead 615 to the conductor 524c. Current is thereby supplied to the accumulator commutators. The connected selector solenoids are energized, setting up their detents and sending the machine through a second rotational cycle.

While the normal current connections from the total key switch 381 are broken near the end of the first cam shaft revolution, as the key switch is released, as previously described, current is supplied to the subtract cam solenoid during the second revolution through leads 572, and 616, point 606, arm 605, lead 608 and lead 494, Figure 39. Current is maintained in the cut-in relay 473 by a connection from charged conductor 613 through breaker 601, lead 612, an extension 617 of lead 612, and a wire 618, Figure 39, to the lead 475, from which the current passes through the cut-in magnet 473 and back to the main line 452 through conductor 472.

The extension 617 is also connected to a wire 619, Figure 39, through which current flows to the print cutout solenoid 238, thence to the line 452. By this means, the type bar racks are permitted to drop out of mesh during the second revolution of the mechanism so that no further printing occurs.

To summarize briefly the operation incident to negative total taking are as follows:

The machine goes through a double cycle including two revolutions of the main cam shaft. During the first revolution, the negative total is set up, printed and the throwover switches returned to normal or positive position. During the second revolution the type racks disengage and the machine sets up and subtracts directly a positive quantity represented by the position of the brushes in the accumulators, thus clearing or returning the accumulators to zero.

Due to the fact that the subtract cam solenoid 517 is energized through the entire two revolutions, it is evident that during the second half revolution, after printing the negative total, the machine will subtract in the accumulators the negative total just printed, thus storing double that negative total. This is immaterial, however, as the quantity subtracted in the second revolution always corresponds to the positive digit arrangement standing in the accumulators at the beginning of that revolution, irrespective of the preceding printed total.

It has been explained that in setting up an entry to be added or subtracted, the various digit keys depressed are held down by their respective locking bar solenoids. In case of an error in set up the error key 107 may be depressed, thus directing current through the panel lead 491 and the magnet 471 of the cutout breaker 470, Figure 39. The magnet 471 opens the breaker 470, cutting the connection between the main line 452 and the line conductor 469 which supplies the circuits through the locking solenoids. The latter are deenergized, thus releasing all keys, after which the entry may be made again.

The foregoing description has explained the manner in which the machine is adapted to perform the operations of addition, direct subtraction, and either positive or negative total taking by the inclusion of the permutation panel 153 wired as shown in Figure 39.

Figure 40 shows the inclusion in the machine of the panel 153 wired for the printing of public-utility bills, the amount printed in each case being that corresponding to a consumption quantity entered by the depression of a single key.

For this purpose, the key buttons are inverted to present successive quantity figures from "0" to "49," as shown in Figure 4, each figure representing a consumed quantity, for instance, in kilowatt hours. For purposes of illustration, the wiring and operation will be followed through for three typical quantities, namely forty kilowatt hours, thirty-seven kilowatt hours, and zero consumption, the latter requiring the billing of a minimum charge.

The rate for which the panel 153 is wired is as follows:

|  | Per k. w. h. |
|---|---|
| First ten kilowatt hours | cents.. 10 |
| Next 40 kilowatt hours | Do.... 7 |
| Minimum charge | 1.00 |

With the above rate, the amounts to be billed are $3.10 for forty k. w. h., $2.89 for 37 k w. h., and $1.00, the minimum charge, for zero consumption The forty k. w. h. key, shown in Figure 4, is denoted by the numeral 101a. Referring to Figure 40, the switch 620 of key 101a is adapted to complete a connection through one contact pin 621 and a panel lead 622 to the locking solenoid 144a. A second contact pin 623 is connected through a panel lead 624, and external leads 625 and 626, Figure 38, to the digit "3" selector solenoid 627 of the units row. A third contact pin 628 has a connection through a panel lead 629 and exterior leads 630 and 631 to the digit "1" selector solenoid 632, in the tenths row, Figure 38. A fourth contact pin 633 of the switch 620 is connected through a panel lead 634 and the external lead 514 to the add cam solenoid 325. A fifth pin 635 is connected through a panel lead 636, an extension 637 thereof, and the exterior lead 475 with the magnet 473 of cut-in relay 474, Figure 38.

It will be understood, in connection with Figure 40, that all electrical connections throughout the machine, except those made in the permutation panel, are the same as previously set forth in relation to Figures 38 and 39.

When the quantity "40" key 101a is depressed, the locking bar solenoid 144a operates as previously described, locking the key switch 620 in contact with all its pins. Current flows from pins 623, 628 and 633 through their respective connections set forth above to energize selector solenoids 627 and 632, Figure 38, and the add cam solenoid 325, Figure 40. The solenoids 627 and 632 set up their respective selector detents, and due to the fact that the cut-in relay 474 is closed by current supplied to its magnet from pin 635 through the leads noted above, the completion of the selector set up immediately completes the circuit through the conductor 489 to the motor relay magnet 457 and clutch trip solenoid 421, Figure 40. The motor is thereby started and the clutch tripped, causing the machine to go through a single rotative cycle, as previously described, printing the billed amount 3.10. The operation of the add cam solenoid 325 causes the amount 3.10 to be stored in the accumulators during the first half of the cycle.

The switch 127 of key 102a, which key represents the quantity of 37 k. w. h. as shown in Figure 4, is adapted to make connection through the pin 161, the conductor 461, which, as previously explained, diagrammatically represents an extension of the pin 161 itself, and a panel lead 638 to the locking bar solenoid 144. The pin 162 has a panel connector 639 leading through the external conductor 514 to the add cam solenoid 325. From pin 163 a connection is made through a panel lead 640 and external leads 641 and 642, Figure 38, to the digit "2" selector solenoid 643 in the units row. Pin 164 has a similar connection through panel lead 644 and external leads 645 and 646, Figure 38, to the digit "8" selector solenoid 647 in the tenths row. Pin 165 is electrically joined through panel lead 648 and external leads 649 and 650, Figure 38, to the digit "9" selector solenoid 651. Pin 166 is connected through panel lead 633, the extension 637 and exterior lead 475 to the cutin relay magnet 473, Figure 38.

When the key 102a, representing a quantity 37 k. w. h., is depressed, the three selector solenoids connected to its pins are energized, setting up the amount $2.89, which amount is printed and stored in the accumulators in the manner described.

The amount to be billed against a current consumption of zero k. w. h., according to the stated rate, is $1.00. The switch 652 of "0" key 105a, therefore, has a contact pin 653 connected by means of a panel lead 654 and exterior leads 655 and 656, Figure 38, to the digit "1" selector solenoid 657 in the units row. Switch 652 also has a contact pin 658 connected through panel lead 659 to its locking solenoid 144d, a third contact pin 660 being connected through panel lead 661 and the exterior conductor 514 to the add cam solenoid 325. A fourth contact pin 660a is connected through panel lead 660b, the extension 637 and exterior lead 475 to the cutin relay magnet 473, Figure 38.

Depression of the "0" quantity key 105a closes circuits through the locking solenoid 144d, the selector solenoid 657 and the add cam solenoid 325 via the connections described, causing the machine to set up, print and store the amount $1.00.

The foregoing description has shown the manner in which three typical groups of wiring connections in the panel 153 make it possible for the machine to print billed amounts calculated according to a given rate from the quantities represented by figures on the keys depressed, and to store the billed amounts to accumulate a total thereof, each billing being carried out by the machine in a single rotation cycle requiring only the depression of a single key. The prewired permutation panel 153 comprises similar groups of leads by which each quantity key switch in the bank is connected to the proper control members to cause the printing and storing of its corresponding billed amount based on the rate for which the panel is wired.

The switch 381 of the total key 109, Figure 40, has connections from four of its pins as follows:
1. Through panel lead 662 to the locking solenoid 393;
2. Through panel lead 663 and exterior conductor 494 to the subtract cam solenoid 326;
3. Via panel lead 664, exterior conductor 496, throw-over switch 497, Figure 38, and lead 498 to the total symbol selector solenoid 499;
4. Through panel wire 665, exterior lead 501, breaker 524, conductor 524c and the various switches previously described, to the accumulators; and
5. Through panel lead 475a and exterior lead 475 to the cut-in relay magnet 473.

It will be noted that the above total key switch connections in Figure 40 and 38 are the same as those previously shown in Figures 39 and 38.

When the total key 109 is pressed, therefore, the positive total of the accumulated amounts is printed and the accumulators cleared in the same manner as previously described for positive total taking.

Figure 41, as previously stated, represents, in combination with Figure 38, a set of typical circuits of the machine including the permutation panel 153 wired for a service such as tax billing, wherein the printed amounts represent the product of the entered quantities and a pre-determined multiplier such as a given tax rate.

The tax rate chosen for illustration is $3.45 tax per $100.00 of assessed value, and an assessed valuation of $24,630.00 has been chosen for the present example.

As tax assessments are not made in fractional dollars the entire keyboard may be utilized for dollars, the right hand row of keys 105 representing units, row 104 tens, 103 hundreds, 102 thousands and 101 ten thousands, this assumption being made possible by the fact that no direct connection exists between any key and any particular type row or digit, their relation being determined at any time entirely by the wiring of the particular permutation panel in place in the machine.

In the present case the switch 662 of digit "2" key 101b of the ten thousands row has the following connections:

1. Through the pin 666 and panel lead 667 to the locking solenoid 144a;
2. Through pin 668, panel lead 669 and exterior lead 514 to the add cam solenoid 325;
3. Through pin 670, panel lead 671, and exterior lead 619 to the type bar cutout solenoid 238, also from 319 through 617, 618 and 475 to cut-in relay magnet 473, Figure 38;
4. Through pin 672, panel lead 673, and exterior wires 674 and 675, Figure 38, to the digit "6" selector solenoid 676 in the hundreds row; and
5. Through pin 677, panel lead 678, and exterior leads 679 and 680, Figure 38, with the digit "9" selector solenoid 681 in the tens row.

When the switch 662 is closed by depression of the key 101b the locking solenoid 144a, the add cam solenoid 325, the type bar cutout solenoid 238 and the selector solenoids 676 and 681 are energized through their connections described above. The cut-in relay 474 being closed due to current feeding to its magnet through conductors 618 and 617 from the energized conductor 619 leading to the type cutout solenoid 238, the completion of the selector set up closes the circuits through the conductor 489 and the motor relay magnet 457 and clutch trip solenoid 421. The machine performs a cycle, storing the amount $690.00 in the accumulators, but due to the action of cutout solenoid 238 the print bars are allowed to drop out of mesh.

The amount stored, 690.00, is a partial product, being the result of multiplying the 20,000.00 by the tax rate of 3.45 per hundred (100.00) or $.0345 per unit.

The switch 684 of digit "4" key 102b has the following pin connections;

1. Through panel lead 685 to the locking solenoid 144;
2. Through panel lead 686 and exterior lead 514 to the add cam solenoid 325;
3. Through the panel lead 687 and exterior lead 619 to the type cutout solenoid, and through 617, 618 and 475 to the cutin relay magnet 473, Figure 38;
4. Through panel lead 688 and exterior leads 689 and 690, Figure 38, to the digit "1" selector solenoid 691 in the hundreds row;
5. Through a panel lead 692 and exterior leads 693 and 694, Figure 39, to the digit "3" selector, solenoid 695 in tens row; and 6. Through panel lead 696 and exterior leads 697 and 698, Figure 38, to the digit eight selector solenoid 699 in the units row.

When the key 102b is depressed the quantity 138.00 is stored in the accumulators in the manner previously described. This partial product, representing the result of multiplying 4,000 by .0345, the tax rate per unit, is added to the partial product 690.00 already stored by depression of the key 101b.

The switch 700 of digit "6" key 103a has a pin connections as follows:

1. Through panel lead 701 to the locking solenoid 144b;
2. Through panel lead 702 and exterior lead 514 to the add cam solenoid 325;
3. Through panel lead 703 and exterior lead 619 to the type cutout solenoid 238, also through 617, 618 and 475, to the cutin relay magnet 473, Figure 38;
4. Through panel lead 704 and exterior leads 705 and 706, Figure 38, to the digit "2" selector solenoid 707 in the tens row; and
5. Through panel lead 708 and exterior leads 709 and 710, Figure 38, with the digit "7" selector solenoid 710a in the tenths row.

When key 103a is depressed, the ensuing cycle of the machine adds the partial product 20.70 to the partial products already stored in the accumulators, this partial product being the result of multiplying the quantity 600.00 by the rate factor .0345.

The switch 711 of the digit three key 104a has the following pin connections:

1. Through panel lead 711a to the locking solenoid 144c;
2. Through panel lead 712 and exterior conductor 514 to the add cam solenoid 325;
3. Through panel lead 713 and exterior lead 619 to the type cutout solenoid 238, and through 617, 618 and 475 to the cutin relay magnet 473, Figure 38;
4. Through panel lead 714 and exterior leads 655 and 656, Figure 38, to the digit "1" selector solenoid 657 in the units row;
5. Through the panel lead 715 and exterior leads 716 and 717, Figure 38, to the digit "3" selector solenoid 718 in the hundredths row; and
6. Through panel lead 719 and exterior leads 720 and 721, Figure 38, to the digit "5" selector solenoid 722 in the thousandths row.

Depression of key 104a operates through the connections described to initiate a cycle which stores the amount 1.035 in the accumulators in addition to the partial products already stored therein.

The foregoing operations may be summarized by the following table:

| Partial quantities entered | Rate | Partial products |
|---|---|---|
| 20,000 | × .0345 = | 690.00 |
| 4,000 | × .0345 = | 138.00 |
| 600 | × .0345 = | 20.70 |
| 30 | × .0345 = | 1.035 |
| Total quantity 24,630 | | Total product 849.735 |
| 24,630 | × .0345 = | 849.735 |

From the above table it is evident that the total accumulated equals the product of the total entered quantity multiplied by the rate factor, the total product including the third fractional decimal. In billing it is not practical to include fractional cents, the custom being to add one cent if the fractional cent is equal to or greater than one-half center to drop the fraction if it is less than one-half cent. In terms of dollars the third decimal in the above example is .005 or one-half cent. Accordingly one cent should be added to the total accumulated product making the amount to be filled 849.74. In order to perform this function, the following provision is made:

The switch 380 of fraction key 108 has the following pin connections from its pin group 385:

1. Through panel lead 723 to the locking solenoid 393;
2. Through panel lead 724, the panel lead 712 representing a continuation of 724, and the external lead 514 to the add cam solenoid 325;
3. Through panel lead 725, an extension 726 thereof and exterior lead 619 to the cutout solenoid 238, and through 617, 618 and 475 to the cut-in relay magnet 473;
4. Through panel lead 727 and an external lead 728, Figures 41 and 38, to the second slip ring 367 of the fractional cent commutator 378, previously described in connection with Figure 19. The segment 370, which, as previously described, extends from the digit "5" to the digit "9" positions inclusive, in the commutator 378, is connected through conductors 729, 730, 731 and 732 with the digit "1" selector solenoid 733 in the hundredths row.

When the fraction key 108 is depressed, current flows through the connections described to the add cam solenoid 325, the type cutout solenoid 238, the cutin relay magnet 473, and the locking solenoid 393. Current also flows through panel lead 727 and external lead 728 to the second slip ring 367. As the digit "5" has previously been entered in the fractional cent commutator, the brush 369 connects slip ring 367 with the segment 370 allowing current to flow through the conductors described above to the digit "1" selector solenoid 733 which is thereby energized, initiating a cycle of the machine which adds the quantity .01 to the sum already stored in the accumulators. The total stored in the present example is therefore 849.745. As the thousandths or third frictional decimal place set up mechanism is not provided with a type bar, it is obvious that if the above total be taken the third decimal digit will be dropped in printing, leaving the printed amount 849.74.

The switch 381 of the total key 109 has the following connections from its pin group 386:

1. Through panel lead 734 to the locking solenoid 393;
2. Through panel lead 735, a continuation 736 of 735, and exterior lead 494 to the subtract cam solenoid 326;
3. Through panel lead 737, the exterior lead 501, breaker 524, lead 524c and its branch switches to the accumulator commutators; and
4. Through panel lead 738 and exterior lead 475 to the cut-in relay magnet 473, Figure 38.

When the total key 109 is depressed, the ensuing cycle of the machine prints the accumulated total in the manner previously described except that the fractional cent remaining in the third decimal accumulator 378 is omitted from the printed total. The total printed in the present instance is 849.74, the proper tax billing for the assessed valuation of $24,630 figured at the tax rate of $3.45 per $100.00.

During the second half of the cycle the amount standing in all the accumulators is subtracted in the manner previously described, thus clearing the accumulators.

The foregoing description has shown by a specific example how the use in the machine of a permutation panel wired to extend entered quantities directly to their products by a pre-determined factor may be used in tax billing, it being understood that the panel is prewired throughout to connect each digit key throughout the banks with the selector solenoids representing the product corresponding to the quantity entered by depression of that key. For purposes of simplicity, the key switches have been shown as comprising six contact pin connections each, but it will be understood that these switches may be provided with any desired number of pins within practical limits, the minimum of six shown throughout the foregoing description being entirely illustrative. When it is desired to construct the machine and panels with a comparatively large number of pins per switch one alternative structure may be used as shown in Figures 61 and 62 and hereinafter explained in connection with the description of a machine especially designed throughout for tax billing and the like.

In case the first accumulated total of partial products includes a third decimal fraction less than .005, that is, less than one-half cent, the brush 369 of the fractional cent commutator 378, Figure 38, does not make contact with the segment 370. Consequently, when the fraction key 108 is pressed no selector solenoids are energized, the machine performing an idle cycle.

When the total is then taken by depression of the key 109 the amount printed is the original accumulated amount with the fractional cent omitted.

If it is ascertained that a wrong digit has been entered at any time previous to printing the total or billed amount, the entered quantity may be removed for correction as follows:

The switch 379 of error key 107 has the following connections from its pin group 379a, Figure 41:

1. Through panel lead 739 to the locking solenoid 393;
2. Through panel lead 740, exterior lead 501, breaker 524, Figure 38, conductor 524c and its branch switches to the accumulator commutators;
3. Through a panel lead 741, the extension 736 representing a continuation thereof, and the exterior lead 494 to the subtract cam solenoid 326; and
4. Through panel lead 742, the extension 726 representing a continuation thereof, and the exterior lead 619 to the type cutout solenoid 238, also from 619 through 617, 618 and 475 to the cut-in relay magnet 473, Figure 38.

When the error key is depressed, the above connections cause the machine to go through a normal subtraction cycle, as previously described in relation to ordinary direct subtraction, except that, due to the action of cutout solenoid 238, no printing occurs and the effect is simply to subtract in the accumulators any amount stored therein at the beginning of the cycle. The accumulators are thus cleared, allowing the desired quantity to be entered correctly.

In the entering of multi-digit quantities for tax billing and the like, it has been seen that the machine performs a storing cycle at each depression of a digit key, in consequence of which the locking magnet releases the key during the process of the cycle. In entering such quantities, however, it is desired that the keys operated remain slightly depressed until the entire entry is completed, in order to prevent confusion and double digit entries on the part of the operator.

For this purpose the following provision is made, referring to Figure 7:

When a locking bar 136 is drawn to the left by solenoid 144 following the depression of a key in its row, the small lever 145 is swung clockwise by its spring 147, interposing the toe 148 between the stop plate 150 and the end of bar 136. When the bar 136 is returned to the right by spring 137 after de-energization of the solenoid 144, the bar encounters the toe 148 which prevents its complete return to normal position. The wedge 138 thereby is prevented from entirely releasing the bridge 135 of the key shank 122, so that the key is held depressed sufficiently to indicate its previous operation but not sufficiently to hold the switch piston 128 in contact with any of its contact pins. The key remains in this partly depressed position until the operation of the total key 109 or any other key served by the locking bar 392, Figure 23. When any of the latter keys is depressed, causing the locking bar 392 to be drawn to the left, the hook 394 on bar 392 rocks the hinged transverse member 151 to the left, engaging the upward extension 152, of lever 145. Levers 145 are thereby rocked counterclockwise, withdrawing the interposed toes 148 and allowing the locking bars, such as 136, to complete their return to the right to release the partly depressed keys.

In the use of the machine for straight addition or subtraction, the levers 145 function in the same manner to retain digit keys partially depressed until the entry is completed by depression of the add or subtract key. In the case of utilities billing, however, when no key controlling the hook 394 is operated until a total is taken, it is necessary that the keys immediately return to normal position. When using the machine for this purpose, therefore, the pivot rod 146 may be removed through the frame 120, thus permitting the levers 145 to drop out of operative position and remain suspended from their springs 147.

In the printing of added or subtracted amounts, it is customary to employ a continuous roll of paper, while bills may normally be printed on individual forms. Referring to Figure 5, it will be seen that shaft 143 of the platen 274 is rotatably mounted on angular end levers 744 rockable on hollow pivots 745 secured in brackets 746 formed on the rear of the base or frame 116. A rod 747, through the pivots 745 is adapted to carry a roll 748 of paper 273. A pressure roller 750 in compressive contact with the platen 274, has an axial shaft 751 also rotatably mounted in the end levers 744. Elongated U-shaped members 752, secured to the frame 116, are disposed in front of the platen 274 to act as supports in which a bill form may rest and also to serve as guides for the paper 273 which is fed from the roll 748 between the platen and the pressure roller 750.

Figure 11A:
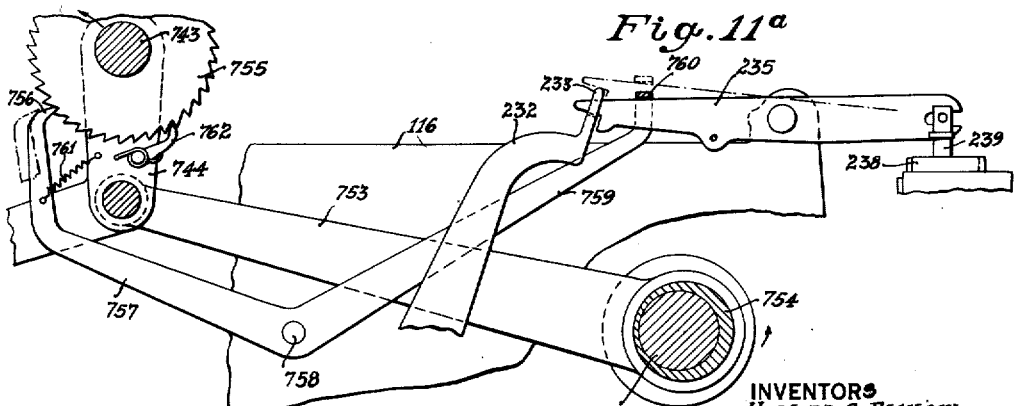
Figure 11a is an enlarged fragmental view of the platen control means.

A connecting rod 753, pivoted to the end levers 744 at the angle thereof, engages an eccentric 754 on the cam shaft 240, as shown in detail in Figures 11a and 24.

In Figures 11a and 5, the eccentric is shown at approximately right hand dead center, corresponding to the forward position of the platen 274, in Figures 5 and 11, in which position printing is about to occur. After printing is completed and the cam shaft 240 revolves, the eccentric 754 to the left, the connecting rod 753 rocks the levers 744 upward and to the left on the pivots 745, as shown in dot and dash lines, Figure 5. By this motion the platen 274 is withdrawn from printing position and raised at the same time, bringing the printed portion of the bill or paper above the level of the ribbon 272 and the type bars 247, so that the figures just printed are visible to the operator. The platen remains normally in its elevated and withdrawn position while the machine is stopped, thus allowing bills to be readily withdrawn from or placed in the supporting members 752, and during the first half of a cycle the eccentric 754 draws the platen, together with the paper or bill, into operative position in line with the type bars and ribbon 272, as shown in Figures 5 and 11.

Figure 11a also shows a means of advancing the paper 273, the parts thereof having been omitted from Figures 5 and 11 to avoid confusion by avoiding the showing of an undue multiplicity of superimposed structures. The platen shaft 743 has secured thereto a ratchet wheel 755 adapted to engage the tooth 756 of a pawl lever 757 pivoted to the frame 116 at 758.

An upwardly inclined arm 759 of the lever 757 has on the end thereof a hook or tab 760 overlying the forward portion of the type bar release rocker 235. A tension spring 761 attached to the lever 757 and the platen supporting lever 744 normally holds the tooth 756 in engagement with the ratchet wheel 755. A spring pressed pawl 762, mounted on the supporting lever 744, is provided to limit the rotation of the ratchet 755 to the counterclockwise direction.

When the supporting levers 744 are rocked upward and to the left by the operation of the eccentric 754, as previously described, the shaft 743 swings in an arc indicated by the curved arrow, Figure 11a. The engagement of the tooth 756 with the ratchet restrains the latter's movement at the point of contact, causing the ratchet to revolve counterclockwise through an arc sufficient to cause the platen 274, Figure 5, to advance the paper 273 upward a distance equal to the normal vertical line spacing between print rows.

The above operation takes place during the second half of each print cycle of the machine. During cycles in which no printing occurs, for instance when partial products are being accumulated as previously described, the advance of the paper is prevented as follows:

As type bar release or cutout rocker 235 rocks upward, as indicated in dot-and-dash lines in Figures 11a, to release the lever 235, it engages the tab 760 and moves the latter upward. The pawl lever 757 is thereby rocked counterclockwise, disengaging the tooth 756 from the ratchet 755 and holding it clear thereof during the upward and leftward movement of the platen. By this means the advance of the paper is prevented except after printing has occurred.

The usual hand wheel 763, Figure 6, is provided on the end of shaft 743 to permit advance of the paper 273 by hand. If desired in billing, the paper 273 may be carbon jacketed and the bill forms inserted in the supports 752 in front of it. By this means, a strip record may be kept of the amounts billed on the forms. The ribbon 272, provided with the usual magazine 764 and 765, Figure 6, may be moved by suitable means, and as such means are well known in the art their description herein is unnecessary.

The foregoing description has set forth the manner in which one form of the invention may be made to perform three different types of functions; namely 1. Direct addition, direct subtraction, positive and negative total taking;

2. Public utility billing;
3. Tax computation and billing.

The change from one type of functional operation to another is accomplished by inserting in the machine permutation panels identical in main structure and differing only in their pre-wiring, and if necessary reversing the buttons on the entry keys. It will be understood that in tax billing the key faces shown in Figure 1 are turned upward.

From the foregoing description, illustrating the application of the invention to certain typical computational functions, it will readily be evident to those skilled in the art that it is applicable to a wide variety of computational uses such as calculating and billing insurance charges, calculating and recording interest, dividends, commissions, installment payments, discounts and payments based on piece work rates; translating and recording foreign exchange rates and the like.

In the appended claims the expression "integral quantity" is used to denote complete item entries, as opposed to individual digits making up an item. Thus, in the case of utility billing as described, the entry of the complete consumption item is made by depression of a single key, for instance key 103, Fig. 4, which enters the complete or integral quantity 29, rather than either of the individual digits 2 or 9. Similarly the keys singly operable to enter integral quantities are termed "integral quantity keys" as opposed to digit keys. While the lowest order row of keys in Fig. 4 represents single digits, these keys nevertheless refer to integral quantities, since each is individually adapted to enter a complete item, the integral quantities in the case of the lowest order row being each less than ten.

While the invention has been described in preferred form, it is not limited to the exact structures illustrated, as various modifications may be made without departing from the scope of the appended claims.

What is claimed is:

1. In a computing device, in combination, a plurality of selector bars, means to differentially actuate said selector bars, an electric motor drive for operating said actuating means, detents adjustable to stop said selector bars and to control differential actuation thereof, individual electrical means to position said detents for stopping said selector bars, a plurality of switching means, connections between each of said switching means and one or more of said electrical means whereby each of said switching means may be adapted to control one or more of said individual electrical means, means controlled by said switching means to disable the motor circuit when operation of the electrical means is initiated by the switching means, and means operable by the detents when fully positioned by the electrical means to reenable said motor circuit.

2. In a computing device, in combination, a plurality of selector bars, means to differentially actuate said selector bars, an electric motor drive for operating said actuating means, detents adjustable to stop said selector bars and to control differential actuation thereof, individual electrical means to position said detents for stopping said selector bars, a plurality of normally open switching means each having multiple contacts, connections between each of said switching means and one or more of said electrical means whereby each of said switching means may be adapted to control one or more of said individual electrical means, means controlled by said switching means to disable the motor circuit when operation of the electrical means is initiated by the switching means, means operable by the detents when fully positioned by the electrical means to reenable said motor circuit, individual manually operable means to close said individual switching means, second electrical means operable by said switching means to hold said switching means closed, a circuit breaker operable by said motor drive to de-energize said second electrical means and thereby release said switching means, and means on said selector bars to retain said detents in stop position independently of said first electrical means.

3. In a device of the character described, in combination, an accumulator including a plurality of commutators in successive denominational orders, means including actuator bars to effect entries in said accumulator, a plurality of digital selector detents operable to stop said bars for determining the values of said entries, individual electrical means controllable through said commutators to operate said detents, means including a power circuit to cause said entry effecting means to effect said entries, means controllable through said commutators to disable said power circuit, and means operable by each of said individual electrical means to reenable said power circuit.

4. In a device of the character described, an accumulator including a plurality of commutators, means to effect entries therein, electrical means controllable through said commutators to determine the value of said entries, switching means to control said electrical means independently of said commutators, means including a power circuit to cause said entry effecting means to effect said entries, means controllable either through said commutators or through said switching means to disable said power circuit, and means operable by said determining means to reenable said power circuit.

5. In a computing device comprising a frame, a plurality of selector bars associated therewith, means to advance said selector bars to selecting positions means to control said advancing means, detents adapted to stop said selector bars whereby said positions may be selected, and individual electrical means to position said detents for stopping said selector bars, in combination a plurality of electrical contact-making members having a source of current, a panel in said frame, a plurality of groups of mutually insulated contact members in said panel, each group underlying one of said contact-making members, one contact member of each group normally projecting above the other contact members thereof, keys manually operable to move said contact-making members into engagement with said normally projecting contact members, electro-magnets electrically connected through said panel to said normally projecting contact members and adapted to be energized by said engagement, means operable by said electro-magnets to move said contact-making members into engagement with the non-projecting contact members of said groups, each of said electro-magnets and moving means being cooperative with a plurality of said contact-making members, means including conductors leading through said panel and forming connections from one or more of said non-projecting contact members of each group respectively to one or more of said individual electrical means, and means operable by said control means to de-energize said magnets.

6. In a device of the character described, in combination, an accumulator having a series of accumulator units of successive decimal orders, each unit including a commutator having successive conducting segments in angular relation corresponding to digits "0" to "9" inclusive and a brush adapted to engage said segments in correspondence with the digit entries made in said unit, a plurality of rows of electrical selectors adapted to set up digit entries in said successive decimal orders, each of said rows comprising digit selectors from "1" to "9" inclusive having electrical connections to the segments "1" to "9" respectively of the commutator of corresponding order when the total in said accumulators is positive, means to direct current impulses through said commutators to said selectors to set up said total, means operable by the highest order accumulator unit to disconnect each of said commutator digit segments from its corresponding selector and to connect said segment to the selector corresponding to the nines complement of the digit of said segment, and means operable by said highest order accumulator unit when said total passes zero in either direction to cause an advance of one digit in said direction in the lowest order accumulator unit of said series.

7. In a device of the character described, in combination, an accumulator having a series of denominational units each having normal digit positions and means to effect a carry-over in the unit of next higher order whereby a total may be accumulated in said series, commutators on said units, printing means comprising plural sets of value selector electro magnets and electrical connections between said electro-magnets and said commutators for controlling said electro-magnets through said commutators in the normal digit positions of said units to print digits comprising said total when said total is a positive amount, means operable by the carry-over means of the highest order unit in either direction to cause a carry-over in said direction in the lowest order unit, means controllable by said carry-over means of said highest order unit to alter the control connections between said commutators and said value selector magnets whereby said printing means may print the nines complements of digits corresponding to said normal digit positions when said total is negative, operating means to effect entry simultaneously in different denominational orders of said accumulator and to actuate said printing means under control of said selector magnets, said operating means being normally disabled, and means operable by said magnets upon completion of their selecting action for enabling said operating means.

8. In a computing device, in combination, an electric actuator motor, a current control line to said motor, a normally closed breaker, a normally open breaker, said breakers being connected in parallel in said control line, a plurality of digit selectors settable to control entry of digit amounts in said device preliminary to a computational functions, means to effect said entry, means operable by said motor to cause operation of said entry affecting means, means to selectively actuate said selectors, means operable by initiation of said selector actuation to open said normally closed breaker, and means operable by each of said selectors upon completion of digit set up to close said normally open breaker.

9. In a device of the character described, in combination, a plurality of keys, switches operable by said keys, means to retain said switches in operated position, a plurality of digital selector solenoids disposed in rows, each row containing solenoids in digital order from one to nine, selector detents operable by said solenoids, selector bars cooperative with the detents of said rows, means including a plurality of leads arranged to convey electrical impulses from each of said switches to one or more of said solenoids whereby said detents may be set up in predetermined combination, means to move said selector bars into engagement with said set-up detents, means to disable said retaining means and de-energize said solenoids, means on said selector bars to retain said set-up detents in engagement with said bars independently of said solenoids after said solenoids are de-energized, and means to withdraw said bars from engagement with said detents.

10. In a device of the character described having a drive motor, a control circuit therefor and actuating mechanism adapted to be driven by said motor; a selector bar, means controllable by said actuating mechanism to advance said bar, digital selector detents cooperative with said bar to limit the advance thereof, individual electro-magnets adapted to set up said detents, said individual magnets being connected on one side to a common electrical conductor, a quick-acting relay having normally closed contact members connected in series in said motor control circuit, the coil of said relay being connected in series with each of said magnets through said common conductor, a normally open switch connected across and in parallel with the contacts of said relay, and means operable by each of said detents to close said switch.

11. The combination claimed in claim 10 wherein said closing means includes an extension on one of said detents adapted to engage said switch to close the same and a member operatively engaging said first detent and adapted to be engaged and moved by each of said other detents.

12. In a computing machine having a main drive motor and a control circuit therefor, in combination, a plurality of denominational rows of electro-magnetic set-up selectors, each row comprising individual digital selectors, means to direct energizing currents through said electro-magnetic selectors, a normally closed magnetic breaker associated with each row and having its coil connected in series with each of said magnetic selectors, the normally closed contacts of all said breakers being connected in series in said motor control circuit, a normally open switch associated with each of said rows, said switch of each row having its contacts connected across and in parallel with said normally closed breaker contacts of said respective row, and means operable by each of said magnetic selectors of each row respectively to close said switch associated with said row.

13. A business machine including a power circuit, a magnetic pre-selector, means to supply an electric current to said pre-selector to actuate the same, means operable by said current to disable said power circuit, said disabling means being operable in shorter time than said pre-selector, and means operable by said pre-selector to reenable said power circuit when said preselector is fully actuated.

14. A business machine including a power circuit, a plurality of magnetic pre-selectors, means to energize one or more of said pre-selectors to actuate the same, means controlled by said energizing means to disable said power circuit when actuation of said pre-selector or pre-selectors is initiated by said energizing means, and means operable by said energizing pre-selector or pre-selectors when fully actuated to reenable said power circuit.

15. In a device of the character described, in combination, an electro-magnet, a movable member adapted to be positioned by said magnet when said magnet is energized by an electric current, a normally closed circuit breaker adapted to be opened by said current when said current is initiated, and a normally open switch adapted to be closed by said movable member when said member is fully positioned, the contacts of said switch being connected across and in parallel with the contacts of said breaker.

HOWARD G. FISHACK.
LOREN B. MILLER.
JOHN J. SHIVELY.

CERTIFICATE OF CORRECTION.

Patent No. 2,293,127. August 18, 1942.

HOWARD G. FISHACK, ET AL.

It is hereby certified that error appears in the printed specification of the above numbered patent requiring correction as follows: Page 20, first column, line 70, claim 8, for "functions" read --function--; page 21, first column, line 10, claim 14, for the word "energizing" read --energized--; and that the said Letters Patent should be read with this correction therein that the same may conform to the record of the case in the Patent Office.

Signed and sealed this 22nd day of September, A. D. 1942.

(Seal)

Henry Van Arsdale,
Acting Commissioner of Patents.